United States Patent [19]
Ueda et al.

[11] Patent Number: 5,852,479
[45] Date of Patent: Dec. 22, 1998

[54] COLOR LIQUID CRYSTAL PROJECTOR DEVICE

[75] Inventors: Kazuhiko Ueda, Kitakatsutagi-gun; Takahiro Miyake, Soraku-gun, both of Japan

[73] Assignee: Sharp Kabushiki Kaisha, Osaka, Japan

[21] Appl. No.: 702,343

[22] Filed: Aug. 23, 1996

[30] Foreign Application Priority Data

| Sep. 7, 1994 | [JP] | Japan | 7-230417 |
| Aug. 25, 1995 | [JP] | Japan | 7-217984 |
| Sep. 25, 1995 | [JP] | Japan | 7-246471 |

[51] Int. Cl.$^6$ .................................................. G02F 1/1335
[52] U.S. Cl. ................................ 349/9; 349/95; 349/57
[58] Field of Search ................................ 349/5, 6, 7, 8, 349/9, 57, 95

[56] References Cited

U.S. PATENT DOCUMENTS

| 5,283,600 | 2/1994 | Imai | 349/9 |
| 5,381,278 | 1/1995 | Shingaki et al. | 349/9 |
| 5,387,953 | 2/1995 | Minoura et al. | 349/9 |
| 5,459,592 | 10/1995 | Shibatani et al. | 349/5 |
| 5,570,209 | 10/1996 | Usui et al. | 349/5 |

OTHER PUBLICATIONS

H. Hamada et al., Japanese Laid–Open Patent Publication No. 60–262131, Laid Open on Dec. 25, 1985.

Y. Tajima et al., Japanese Laid–Open Pat. Publication No., 61–11788, Laid Open on Jan. 20, 1986.

H. Hamada, Japanese Laid–Open Pat. Publication No. 4–60538, Laid Open on Feb. 26, 1992.

H. Hamada et al., Japanese Laid–Open Pat. Publication No. 3–53221, Laid open on Mar. 7, 1991.

T. Sato, Japanese Laid–Open Pat. Publication No. 6–3670, Laid open on Jan. 14, 1994.

*Primary Examiner*—William L. Sikes
*Assistant Examiner*—Tiep H. Nguyen
*Attorney, Agent, or Firm*—Dike, Bronstein, Roberts & Cushman; David G. Conlin; Brian L. Michaelis

[57] ABSTRACT

A liquid crystal projector includes a light source for generating light; a liquid crystal display device for modulating the light; a projection optical system for projecting light modulated by the liquid crystal display device onto a screen; and an incidence optical system for dividing the light into at least two light components in an equal wavelength range and causing the two light components to be incident on the liquid crystal display device from different directions. The liquid crystal display device including a liquid crystal panel having a pixel apertures. The two light components incident on the liquid crystal display device enter the plurality of pixel apertures.

21 Claims, 27 Drawing Sheets

PRIOR ART

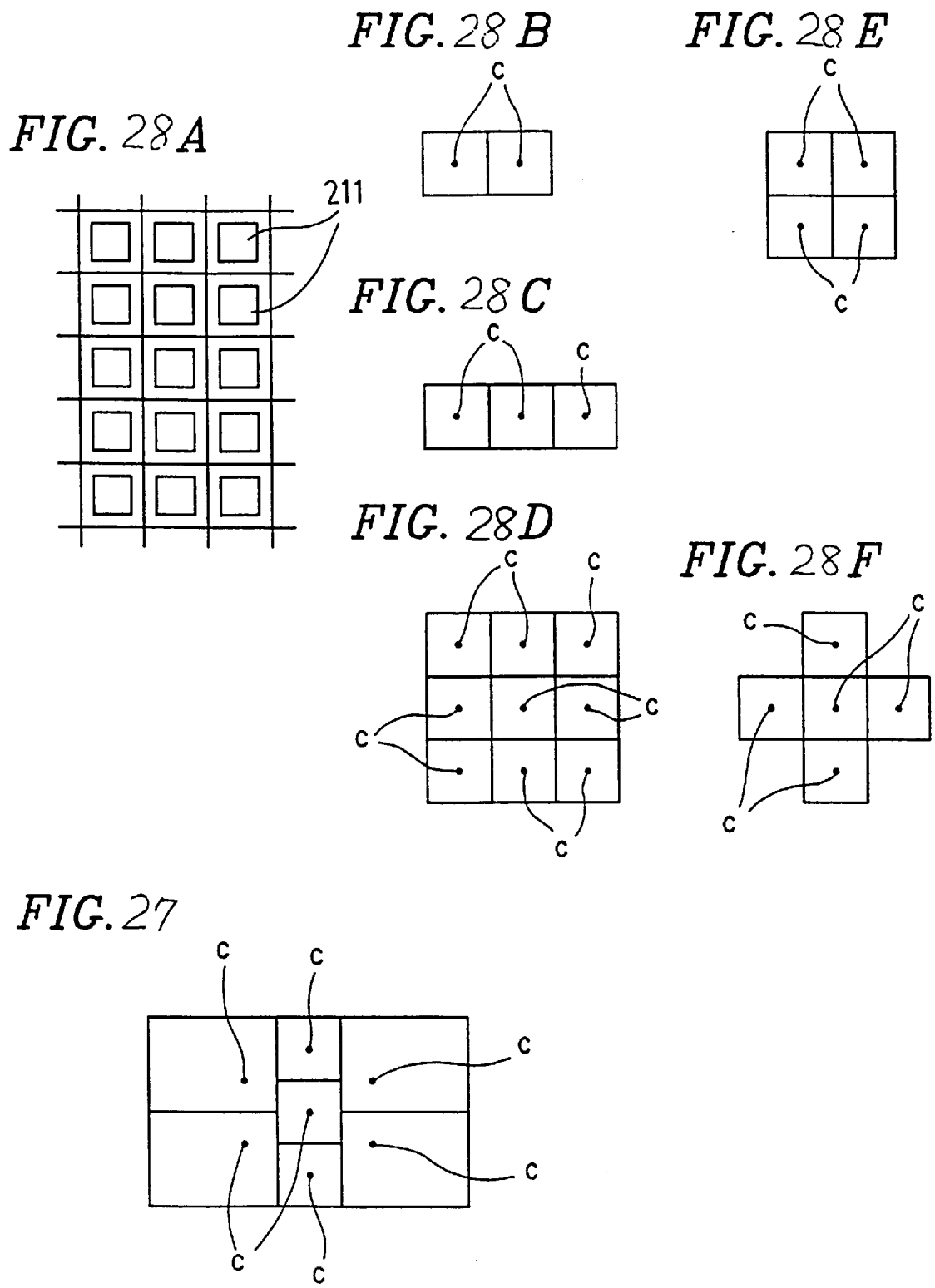

COLOR LIQUID CRYSTAL PROJECTOR DEVICE

BACKGROUND OF THE INVENTION

1. Field of the invention

The present invention relates to a liquid crystal projector for displaying images on a screen using a projection-type optical system, and in particular, a liquid crystal projector for forming images by modulating light using a single or three liquid crystal panels.

2. Description of the Related Art

Conventionally known display panels used for projection-type display apparatuses include liquid crystal panels, electro-chromic display panels, and displays using transparent-type ceramics. Liquid crystal color projectors using a liquid crystal panel have been a target of attention recently as a large-screen display apparatus replacing CRTs.

A conventional optical system used for such a liquid crystal color projector includes a light source formed of a white light lamp such as a metal halide lamp, a halogen lamp, or a xenon lamp. Light emitted from such a light source is reflected and collimated by a spheroid reflector and is incident on a transmission-type liquid crystal panel.

In the transmission-type liquid crystal panel, a plurality of pixels are independently driven using nonlinear devices such as varistors, MIM (metal/insulator/metal) elements and transistors used as switching devices. The nonlinear devices are useful in preventing crosstalk. However, use of the nonlinear devices increases the ratio of the non-transparent, non-display area which does not contribute to the display to the display area of the liquid crystal panel, i.e., it reduces the aperture ratio (the ratio of the effective display area with respect to the total area of the liquid crystal panel). As a result, the effective light utilization efficiency of light incident on the liquid crystal panel is reduced, thereby darkening images to be displayed.

In order to display clearer images at a higher resolution, the area of each pixel needs to be reduced to increase the pixel density on the liquid crystal panel. The aperture ratio will not change if all the components of the pixel can be reduced at the same proportion. This is difficult in practice because reduction in some of the component sizes, for example, the width of the metal wires to be connected to the pixel electrodes and the size of the nonlinear devices such as the transistors, are limited by the precision of etching or positioning.

Accordingly, as the area of each pixel is reduced, the ratio of the non-display area occupied by the metal wires and the like increases to reduce the aperture ratio. A liquid crystal panel having a lower aperture ratio provides darker images even if light is projected with a satisfactory optical system.

For solving such problems, Japanese Laid-Open Patent Publication Nos. 60-262131 and 61-11788 disclose a method for improving the effective light utilization efficiency using a microlens array provided both on the light incident side and the light outgoing side of the liquid crystal panel. By this method, the light directed to a non-display area of the liquid crystal panel is collected to the display area of the liquid crystal panel by microlenses of the microlens array. Thus, the effective aperture ratio is improved to form brighter images.

In the case where the microlenses are used, light to be incident on the microlenses needs to be sufficiently parallel, i.e., the angle made of the central ray of the light (principal ray) and the other rays needs to be as close as possible to 0°, in order to satisfactorily improve the effective aperture ratio. Sufficiently collimated light, after being incident on a microlens, can be incident on a pixel positionally corresponding to the microlens. If insufficiently collimated light is incident on the microlens at an angle exceeding a prescribed maximum tolerable angle, the light is not incident on the display area of the liquid crystal panel and thus does not improve the brightness of the images. Accordingly, light needs to be sufficiently collimated and to be incident at a prescribed angle.

Japanese Laid-Open Patent Publication No. 4-60538 discloses a liquid crystal color projector including a single liquid crystal panel in combination with microlenses. Such a projector, which has a simple optical system, is known as suitable for a compact system.

FIG. 1 is a schematic plan view of a liquid crystal color projector including a single liquid crystal panel.

As shown in FIG. 1, a liquid crystal color projector 100 includes a transmission-type liquid crystal display device 112 and a light source 101 for emitting white light.

Light emitted by the light source 101 is reflected by a spheroid reflector 102 located to have a first focal point at the position of the light source 101, and then is collected at a second focal point of the spheroid reflector 102.

The light is then diffused to have a uniform intensity by an integrator 111 located in the vicinity of the second focal point and then collimated by a condenser lens 103. The collimated light is divided into a red light component, a green light component, and a blue light component by dichroic mirrors 104R, 104G and 104B. Hereinafter, the red, green and blue light components will be collectively referred to as the "RGB light components". In FIG. 1, letters R, G, and B respectively denote the red, green and blue light components. The dichroic mirrors 104R, 104G and 104B respectively reflect light in the wavelength ranges of greater than 580 nm (red light), between 580 nm and 500 nm (green light), and less than 500 nm (blue light). The three light components are directed to pixels for the corresponding colors in the liquid crystal display device 112 at different incident angles.

The liquid crystal display device 112 includes a liquid crystal panel 120 for modulating incident light based on a display signal, a microlens array 110 provided on a surface of the liquid crystal panel 120 on the light incident side for collecting the incident light components onto the pixels of the corresponding colors, a polarizer 108 on the light incident side of the liquid crystal panel 120, and another polarizer 109 provided in the vicinity of the liquid crystal panel 120 on the light outgoing side of the liquid crystal panel 120.

FIG. 2 is a cross-sectional view of the liquid crystal panel 120. As shown in FIG. 2, the liquid crystal panel 120 includes a pair of substrates 133 and 126 and a liquid crystal layer 130 held between the substrates 133 and 126. The substrate 133 (hereinafter, referred to as the "active matrix substrate 133") has a plurality of pixel electrodes 121 (only one is shown in FIG. 2) in a matrix on a surface thereof. The active matrix substrate 133 also has, on the surface thereof, a plurality of signal lines 124 (only one is shown in FIG. 2) provided corresponding to rows or columns of the pixel electrodes 121 and a plurality of gate lines (not shown) also provided corresponding to columns or rows of the pixel electrodes 121. The active matrix substrate 133 further has, on the surface thereof, thin film transistors (TFTs) 122 for driving the pixel electrodes 121 and storage capacitors. Both the TFTs 122 and the storage capacitors are provided in correspondence with the pixel electrodes 121. The TFT 122 includes a semiconductor layer 122a and a gate insulation layer 122b for electrically insulating the semiconductor layer 122a and the gate electrode 125.

The other substrate 126 (hereinafter, referred to as the "counter substrate 126") has the counter electrode 127 provided on a surface thereof, and a light shielding layer 128 provided on the counter electrode 127. The light shielding layer 128 has pixel apertures 132 (only one is shown in FIG. 2) in positional correspondence with the pixel electrodes 121. The liquid crystal layer 130 is formed of, for example, a twisted nematic liquid crystal material. Each pixel electrode 121, the corresponding TFT 122, and the corresponding storage capacitor are included in one pixel.

FIG. 3 is a cross-sectional view of the liquid crystal panel 120 and the microlens array 110 in the liquid crystal color projector 100.

As shown in FIG. 3, the microlens array 110 includes a plurality of microlenses 110a. The RGB light components are each designed to be incident on the corresponding microlens at such an incident angle as to form a light spot only in the pixel aperture 132 of the corresponding color. The microlens array 110 is formed by an ion exchange method.

FIG. 4 shows the positional relationship of the microlenses 110a and the pixel apertures 132. In detail, the pixel electrodes corresponding to red, green and blue are arranged repeatedly in this order on each horizontal line of the display screen. The display area for each color corresponds to each pixel aperture 132. The pixel apertures 132, which are square, are arranged in such a manner that each of the borders of two adjacent openings in one horizontal line is just above the center of one opening in the next horizontal line. The plurality of spherical microlenses 110a each have a hexagonal contour as seen looking along a normal to the microlens array 110 and are arranged in a honeycomb-like manner. The optical axis of each hexagonal microlens 110a corresponds to the pixel aperture 132 for green.

Returning to FIG. 1, among the light components which have been incident on the liquid crystal display device 112, only polarized light components in a prescribed polarization are transmitted through the polarizer 108. In this example, P-polarized light components transmit through the polarizer 108, and S-polarized light components are absorbed by the polarizer 108.

As shown in FIG. 3, the green P-polarized light component is incident on the microlens array 110 vertically and forms a light spot in the pixel aperture 132 for green. The red and blue P-polarized light components are incident on the microlens array 110 at angles θ and −θ with respect to the green P-polarized light component and form light spots in the pixel apertures 132 for red and blue.

In this manner, red, green and blue light components are collected onto the pixel electrodes of the corresponding colors included in the single liquid crystal panel 120. Then, as shown in FIG. 1, the light components transmit through the polarizer 109, a field lens 105 and the projection lens 106 to be projected on a screen 107 to display a multi-color image on the screen 107.

In such a projector, if the incident light is not sufficiently parallel, a sufficient amount of light does not enter the pixel aperture 132 even if the microlens array 110 is provided. In such a case, or if the RGB light components are incident on the liquid crystal panel 120 at a different angle from the prescribed angle, the contrast ratio or the color purity of an image of each color is reduced. When the incident light is even less parallel, the light does not enter the pixel aperture 132 even if collected by the microlens array 110, and thus does not transmit through the liquid crystal display device 112. In order to avoid such problems, the light needs to be incident on the liquid crystal display device 112 as parallel as possible.

For example, a practical example will be considered with a 3-inch panel. In a typical 3-inch panel, the pixel pitch is 100 μm both horizontally and vertically, the size of the pixel aperture 132 is 50 μm (vertical)×78 μm (horizontal), and the number of pixels is 450 (vertical)×600 (horizontal). Where the focal length of each microlens 110a of the microlens array 110, which is based on the thickness of the counter substrate 126 (1.1 mm; refractive index n=1.53), is 0.7 mm (1.1 mm/1.53), the light component entering one pixel aperture 132 needs to be substantially as parallel as $\pm \tan^{-1}(25/720) \pm 2.00°$ in the vertical direction of the pixel electrodes 121; and $\pm \tan^{-1}(35/720) = \pm 2.8°$ in the horizontal direction of the pixel electrodes 121. In other words, in the case where such a 3-inch panel is used, light rays having an angle in the range of up to ±2.0° in the vertical direction and an angle in the range of up to ±2.8° in the horizontal direction with respect to the principal ray of the light component of each color can enter the pixel apertures of the corresponding color of the liquid crystal panel.

As described above, green light components are incident on the liquid crystal panel in the normal direction thereto. Red and blue light components are each incident at a prescribed angle with respect to the green light components. The angle of the principal ray of each of the red and blue light components with respect to the green light component is $\pm \tan^{-1}(100/720) = \pm 8°$. Therefore, in a liquid crystal color projector using the above-described 3-inch panel, the principal rays of red and blue light components are incident on the liquid crystal panel at an angle of 8° with respect to the principal ray of the green light component. Among the rays of each color, light rays having an angle in the range of ±2.0° in the vertical direction and at an angle of ±2.8° in the horizontal direction can enter the corresponding pixel aperture.

In the case of the conventional liquid crystal color projector, generally, the light source is a metal halide lamp having a power consumption of 250 W and an arc length of 3.0 mm. An ellipsoidal mirror has a first focal length of 22 mm, a second focal length of 110 mm, and an effective diameter of 80 mm. When the light having an effective diameter of 80 mm is emitted toward the liquid crystal panel, the light is as parallel as about ±10° max.

In the conventional liquid crystal color projector, only a part of such parallel light which is as parallel as ±2.0° vertically and ±2.8° horizontally is used. The rest of the light is not utilized for display. Thus, in order to improve the brightness of the images, it is necessary to improve the luminance of the light source or to use more parallel light.

When a bright light source is used, the arc length of the light source increases. Accordingly, the light becomes less parallel, and the light utilization efficiency is reduced. When the arc length of the light source is decreased to make the incident light more parallel, the absolute amount of light is reduced. When the diameter or the spot area of the light incident on the liquid crystal panel is increased, a part of the light is not incident on the liquid crystal panel. As appreciated from these explanations, it is almost impossible to raise the brightness of the color images in the conventional liquid crystal color projector including a single liquid crystal panel. There has not been a liquid crystal color projector including a single liquid crystal panel which solves the problem of low light utilization efficiency.

Japanese Laid-Open Patent Publication No. 3-53221 discloses a liquid crystal color projector including three liquid crystal panels in combination with a microlens array. Such a structure is well known.

FIG. 5 is a schematic plan view of a liquid crystal color projector including three liquid crystal panels.

As shown in FIG. 5, a liquid crystal color projector 200 includes three liquid crystal display devices 207R, 207G and 207B respectively used for the RGB colors.

White light emitted by a light source 201 is reflected by a spheroid reflector 202 located to have a first focal point at the position of the light source 201, and then is collected at a second focal point of the spheroid reflector 202.

The light is then diffused to have a uniform intensity by an integrator 225 located in the vicinity of the second focal point and then collimated by a condenser lens 226. The collimated light is divided into RGB light components by dichroic mirrors 206R and 206B respectively for reflecting red and blue light, The three light components are incident on the liquid crystal display devices 207R, 207G and 207B. The liquid crystal display devices 207R, 207G and 207B each include a microlens array 272 and a liquid crystal panel 271. The liquid crystal panels 271 each have the same structure as shown in FIG. 2. The light component incident on each of the liquid crystal display devices 207R, 207G and 207B is collected onto a pixel in the corresponding liquid crystal panel 271 by the microlens array 272.

The light components transmitted through the liquid crystal display devices 207R, 207G and 207B reach dichroic mirrors 240 and 239 respectively reflecting blue and green light and then optically superimposed by the dichroic mirrors 240 and 239. The light component transmitted through the liquid crystal display device 207G for green is transmitted through the field lens 215, reflected by the reflective mirror 242, and then is incident on the diohroic mirror 239. Thus, a multi-color magnified image is projected on a screen 217.

Although not mentioned in the above description, the liquid crystal color projector 200 further includes a mirror 241 for reflecting the red light component from the dichroic mirror 206R toward the liquid crystal display device 207R, and the mirror 242 for reflecting the green light component from the liquid crystal display device 207G toward the dichroic mirror 239.

FIG. 6 shows the positional relationship of the pixels 211a of the liquid crystal panel 271 and the microlenses 210a of the microlens array 272. In FIG. 6, the pixels are represented by reference numeral 211a. As shown in FIG. 6, the microlens array 272 includes a plurality of microlenses 210a. The microlens array 272 is formed by an ion exchange method, and the plurality of spherical microlenses 210a each have a hexagonal contour as seen looking along a normal to the microlens array 272 and are arranged in a honeycomb-like manner. For example, the microlens pitch is equal to the pixel pitch.

The pixels 211a are arranged in such a manner that each of the borders of two adjacent pixels in one vertical line corresponds to the center of one pixel in the next vertical line. The optical axis of each hexagonal microlens 210a corresponds to the center of the corresponding pixel 211a.

Such a liquid crystal color projector 200 also has a problem in that the light is not sufficiently parallel. Referring to FIG. 5 again, light components which are not sufficiently parallel to enter the pixel aperture 211 (FIG. 6) after being collected by the microlens array 272 are not transmitted through the liquid crystal display devices 207R, 207G and 207B.

A practical example will be considered hereinafter with a 3-inch panel. In a typical 3-inch panel, the pixel pitch is 95 $\mu$m both horizontally and vertically, the size of the pixel aperture 211 is 64 $\mu$m (vertical)×64 $\mu$m (horizontal), and the number of pixels is 450 (vertical)×600 (horizontal). Where the focal length of each microlens of the microlens array 272, which is based on the thickness of the counter substrate of the liquid crystal display device 271 is 0.458 mm (0.7 mm (thickness)/1.53 (refractive index)), the light component entering the pixel aperture 211 for green needs to be substantially as parallel as $\pm\tan^{-1}(32/458)=4.0°$ in the vertical direction of the pixels; and $\pm\tan^{-1}(32/458)=4.0°$ in the horizontal direction of the pixels.

An example will be considered in which the above-described 3-inch panel is used together with a metal halide lamp as the light source having a power consumption of 250 W and an arc length of 3.0 mm and an ellipsoidal mirror having a first focal length of 22 mm, a second focal length of 110 mm, and an effective diameter of 90 mm. When the light having an effective diameter of 90 mm is emitted, the light is as parallel as about ±10° max. Accordingly, only a part of the light which is as parallel as +4.0° both vertically and horizontally is used in the entire light emitted which is merely as parallel as ±10° max. The rest of the light is not utilized for display.

Consequently, in order to display a brighter image in the conventional liquid crystal color projector including three liquid crystal panels, it is necessary to cause the light to be more parallel.

When a brighter light source is used in order to obtain a liquid crystal color projector including three liquid crystal panels for displaying a brighter image, the arc length of the light source increases. Accordingly, the light becomes less parallel, and the light utilization efficiency is reduced. When the arc length of the light source is decreased to make the light incident on each liquid crystal display device more parallel, the amount of light is reduced. When the diameter or the spot area of the light incident on the liquid crystal display device is increased, a part of the light does not enter the pixel openings of the liquid crystal panel. As appreciated from these explanations, it is almost impossible to raise the brightness of the images in the conventional liquid crystal color projector including three liquid crystal panels. There has not been a liquid crystal projector including three liquid crystal panels which solves the problem of low light utilization efficiency.

The light utilization efficiency can be reduced by other causes as well as insufficiently parallel incident light.

For a liquid crystal color projector, linearly polarized light having a prescribed polarization direction is often used. In order to obtain such light, a light source for emitting light components having different polarization directions and a polarizer are generally combined. By this method, however, light components having polarization directions other than the prescribed polarization direction are removed by the polarizer before entering the liquid crystal panel. Accordingly, only half or less of the light emitted by the light source is usable, resulting in an excessively large loss of the available light.

As an attempt to solve this problem, the following system has been proposed. Light from the light source is divided into two linearly polarized light components having polarization directions perpendicular to each other, namely, a P-polarized light component and an S-polarized light component by a polarization beam splitter. One of the light components is transmitted through a half-wave plate to rotate the polarization plane thereof by 90° so that the polarization directions of the two light components coincide with each other. Then, the two light components are combined. Thus, the loss of the light emitted from the light source can be minimized, and furthermore, light which is linearly polarized in a prescribed direction can be obtained.

FIG. 7 shows an example of such a system (hereinafter, referred to as the "system 7"). Light emitted by a light source 1 is reflected and collimated by a spherical mirror 2 to be parallel light B. The parallel light B is divided into a P-polarized light component P and an S-polarized light component by a polarization beam splitter 3. The S-polarized light component is reflected by a separation face 4 of the polarization beam splitter 3 and a mirror 5, and then is transmitted through a half-wave plate 6. Thus, the polarization plane of the S-polarized light component is rotated at 90° to be converted into a P-polarized light component P'. The P-polarized light component P' is combined with the other light component P after exiting the system 7. Through such a system, even when the light from the light source 1 has light components having different polarization directions, the S-polarized light component is converted into a P-polarized light component, and thus substantially all of the light from the light source can be used.

The light exiting the system 7 includes two light components P and P', and the total diameter of the two light components (or the total cross-section of the two light components) is twice the diameter (or the cross-section) of the light B entering the system 7. Such a large diameter or cross-section needs to be reduced to be substantially equal to that of one light component when incident on the liquid crystal panel. In other words, the two light components need to be superimposed so as to be incident on the liquid crystal panel at a maximum tolerable incident angle or less.

However, the light source used in such a system 7 shown in FIG. 7 for emitting white light, such as a metal halide lamp, does not emit light from a certain point but from an area including a plurality of points. Light emitted by such a light source is not sufficiently parallel when used as light incident on a liquid crystal panel. Accordingly, the two light components obtained in the system 7 are expanded to a certain degree.

When such two light components are superimposed on a liquid crystal panel combined with a microlens array, the two light components are incident on the liquid crystal panel with optical axes thereof being inclined at an angle with respect to the liquid crystal panel. Since the light components are expanded to a certain degree as described above, the ratio of the light incident on the liquid crystal panel at an angle exceeding the prescribed maximum tolerable incident angle rises. As a result, the effective light utilization efficiency is reduced.

Recently, size reduction has been strongly demanded in liquid crystal color projectors. A smaller liquid crystal panel causes a problem in that the diameter (or the cross-section) of the incident light is too large for the liquid crystal panel to lower the light utilization efficiency.

It is possible to reduce the diameter of the light in accordance with the size of the liquid crystal panel. However, a light beam, for example, from a metal halide lamp is not sufficiently parallel becomes less parallel when reduced in diameter.

SUMMARY OF THE INVENTION

A liquid crystal projector according to the present invention includes a light source for generating light; a liquid crystal display device for modulating the light; a projection optical system for projecting light modulated by the liquid crystal display device onto a screen; and an incidence optical system for dividing the light into at least two light components in an equal wavelength range and causing the two light components to be incident on the liquid crystal display device from different directions. The liquid crystal display device including a liquid crystal panel having a pixel apertures. The two light components incident on the liquid crystal display device enter the plurality of pixel apertures.

In one embodiment of the invention, the liquid crystal display device includes a microlens array which is provided in a path of light to be incident on the liquid crystal panel and which has a plurality of microlenses, the plurality of microlenses causing the two light components to enter the plurality of pixel apertures.

In one embodiment of the invention, the microlens array is positioned so that the plurality of microlenses each correspond to a respective pair of pixel apertures, and the two light components incident on each of the microlenses enter the pair of pixel apertures, respectively.

In one embodiment of the invention, the plurality of pixel apertures are positioned so that two adjacent pixel apertures are opposed to each one of the plurality of microlenses.

In one embodiment of the invention, the microlens array is located so that the pixel apertures each correspond to a respective pair of microlenses adjacent to each other, and the two light components incident on the pair of microlenses both enter the corresponding one pixel aperture.

In one embodiment of the invention, the liquid crystal panel is located so that borders between the adjacent pixel apertures are offset from borders between the microlenses.

In one embodiment of the invention, the borders between the adjacent microlenses are opposed to centers of the plurality of pixel apertures, respectively.

In one embodiment of the invention, the incidence optical system includes a first optical section for dividing the light into a first light component for projection and a second light component for projection and causing the first and the second light components to be incident on a light incident surface of the liquid crystal display device symmetrically with respect to a normal to the light incident surface in a first plane perpendicular to the light incident surface; and a second optical section for dividing each of the first light component for projection and the second light component for projection into three color light components in different wavelength ranges from one another, causing one of the three color light components to be incident along a normal to the light incident surface, and causing the other two color light components to be incident on the light incident surface symmetrically with respect to the one color light component in a second plane perpendicular to the light incident surface and the first plane.

In one embodiment of the invention, the first optical section includes a polarization beam splitter for allowing a first polarized light component to be transmitted therethrough, and reflecting a second polarized light component having a different polarization direction from that of the first polarized light component to cause the first polarized light component to become the first light component for projection; a phase plate for aligning the polarization direction of the second polarized light component to the polarization direction of the first polarized light component to cause the second polarized light component to become the second light component for projection; and a mirror for reflecting the second polarized light component in a prescribed direction so that the first light component for projection and the second light component for projection become symmetric with respect to the normal to the light incident surface of the liquid crystal display device.

In one embodiment of the invention, the second optical section are dichroic mirrors for selectively reflecting the three color light components.

In one embodiment of the invention, the plurality of pixel apertures of the liquid crystal panel are divided into three groups corresponding to the three color light components. The liquid crystal display device includes a microlens array including a plurality of microlenses, and each of the microlenses causes the three color light components of the first and second light components for projection to enter the pixel apertures of the corresponding groups.

In one embodiment of the invention, three liquid crystal display devices are provided respectively for three different wavelength ranges. The incidence optical system further includes an optical member for dividing each of the at least two light components for projection into three color light components respectively in the three wavelength ranges and causes the light components in each wavelength range to be incident on the corresponding liquid crystal display device from different directions.

In one embodiment of the invention, the three liquid crystal display devices each include a microlens array including a plurality of microlenses. The plurality of microlenses correspond to the plurality of pixel apertures one to one, and the microlenses each collect and cause the two light components in the same wavelength range to enter the corresponding pixel aperture.

In one embodiment of the invention, the three liquid crystal display devices each include a microlens array including a plurality of microlenses. Each of the microlenses corresponds to at least two pixel apertures, and collects and causes the two light components in the same wavelength range to enter the at least two pixel apertures corresponding thereto.

In one embodiment of the invention, the incidence optical system includes a fly's eye lens having a plurality of convex lenses. The fly's eye lens is located so that optical axes of the plurality of convex lenses are arranged in a pattern similar to the pattern in which centers of the at least two pixel apertures corresponding thereto are arranged in each of the liquid crystal display devices.

In one embodiment of the invention, the optical member of the incidence optical system includes a paraboloidal mirror for reflecting and collecting the light from the light source. The paraboloidal mirror includes a plurality of surfaces defined by planes including symmetrical axes of the paraboloidal mirror. The surfaces of the paraboloidal mirror are closer to the optical axis of the paraboloidal mirror than a paraboloidal mirror used for reflecting and collimating the light from the light source, the surface being closer to the optical axis so as to cause principal rays of the light components reflected by the surfaces to be superimposed on each of the liquid crystal display devices.

In one embodiment of the invention, the incidence optical system includes a plurality of prisms, which are arranged so that light components transmitted through and refracted by the prisms are superimposed on each of the liquid crystal display devices.

Thus, the invention described herein makes possible the advantages of providing a liquid crystal projector which displays a brighter image and also can be provided in a smaller size.

This and other advantages of the present invention will become apparent to those skilled in the art upon reading and understanding the following detailed description with reference to the accompanying figures.

BRIEF DESCRIPTION OF THE DRAWINGS

FIG. 27 is an exemplary structure of a fly's eye lens usable in the liquid crystal color projector shown in FIG. 21;

FIG. 28A shows an exemplary arrangement of pixels of a liquid crystal display device;

FIGS. 28B through 28F show exemplary structures of a fly's eye lens usable when the pixels are arranged as shown in FIG. 28A.

DESCRIPTION OF THE PREFERRED EMBODIMENTS

In first and second examples according to the present invention, a liquid crystal color projector including an incidence optical system for causing two light components having the same wavelength to be incident on a liquid crystal panel from two different directions will be described. In such an incidence optical system, a microlens array provided on a light incident surface of the liquid crystal panel causes light components emitted by a light source to form light spots in pixel apertures in accordance with the incident angle.

By designing the liquid crystal color projector so that two pixels correspond to one microlens, two light components incident on one microlens enter two different pixel apertures. For example, when the border between two adjacent pixel apertures is offset from the border between two adjacent microlenses so as to oppose the two adjacent microlenses to the one pixel, two light components incident on the border between the two microlenses enters the one pixel aperture. When two adjacent pixel apertures are opposed to one microlens, two light components incident on the one microlens border enters the two different microlenses.

Since two light components enter each pixel aperture as described above, a brighter image can be obtained than the case when a single light component enters each pixel aperture. The light components which enter each pixel aperture are modulated in the liquid crystal display layer of the liquid crystal panel, combined by a projection optical system and then projected on a screen.

Hereinafter, the present invention will be described by way of illustrative examples 1 and 2 with reference to the accompanying drawings.

(EXAMPLE 1)

A liquid crystal projector including three liquid crystal panels in a first example according to the present invention will be described with reference to FIGS. 8 through 11.

Figure 8:
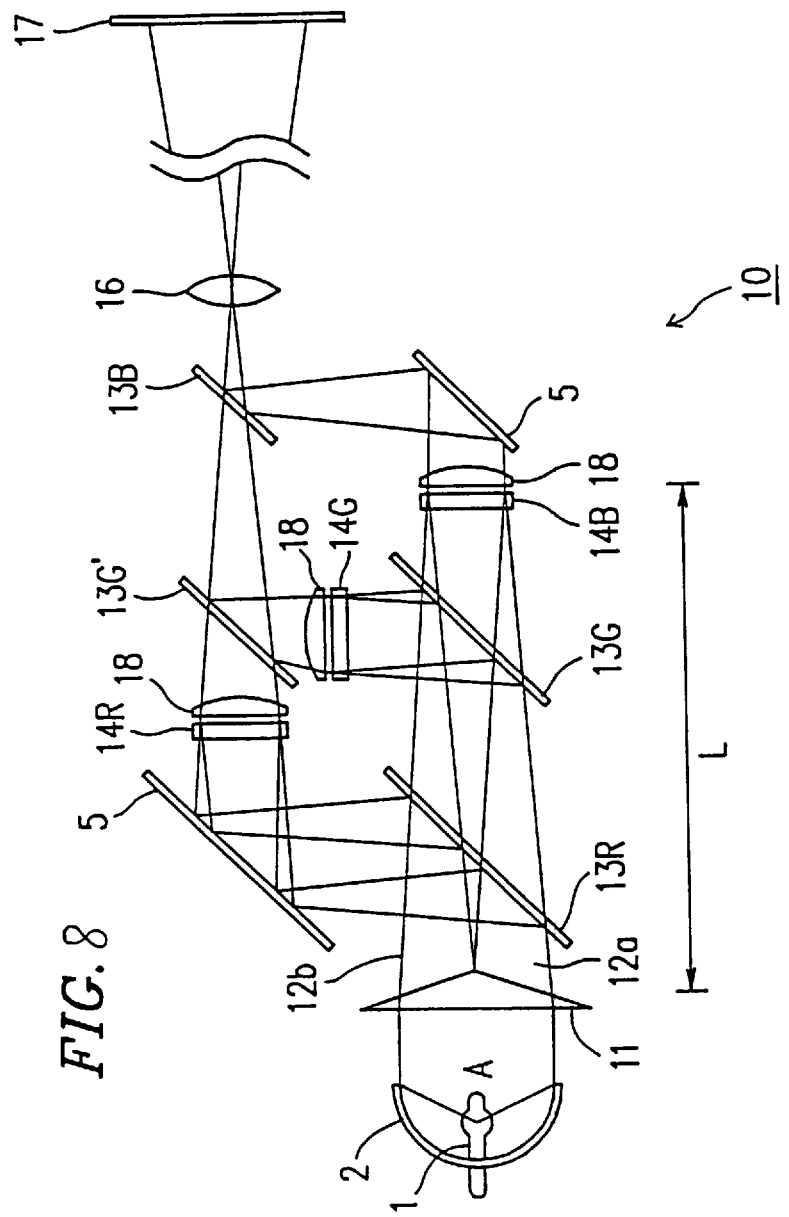
FIG. 8 is a schematic plan view of a liquid crystal color projector in a first example according to the present invention.

FIG. 8 is a schematic plan view of a liquid crystal color projector 10 in the first example. The structure of the liquid crystal color projector 10 will be described together with the operation.

As shown in FIG. 8, light emitted by a light source 1 is reflected and collimated by a spherical mirror 2 to be parallel light A having a circular cross-section. The parallel light A is divided into two light components 12a and 12b (also referred to as the "sub light components" below) by a triangular prism 11 provided as a light shape dividing device.

The liquid crystal color projector 10 includes dichroic mirrors 13R and 13G on optical axes of the light components from the triangular prism 11. The dichroic mirrors 13R and 13G respectively reflect light in prescribed wavelength ranges, namely, red and green light. By the dichroic mirrors 13R and 13G, the two light components are further divided into RGB light components. The RGB light components are incident on liquid crystal display devices 14R, 14G and 14B, respectively. As described below, the liquid crystal display devices 14R, 14G and 14B each include a liquid crystal panel and a microlens array. The red light component reflected by the dichroic mirror 13R is reflected by a mirror 5 to be incident on the liquid crystal display device 14R. The green light component reflected by the dichroic mirror 13G is incident on the liquid crystal display device 14G. The blue light component transmitted through the dichroic mirrors 13R and 13G is incident on the liquid crystal display device 14B.

The light component of each color includes two sub light components 12a and 12b split by the triangular prism 11. In this example, the two sub light components 12a and 12b of each color are incident on a light incident surface of the corresponding liquid crystal display device symmetrically with respect to the normal to the light incident surface in a plane which is perpendicular to the light incident surface and includes the normal to the light incident surface (i.e., the surface parallel to the paper of FIG. 9). The sub light components 12a and 12b are then modulated by an image presented on each liquid crystal display device.

The sub light components 12a and 12b transmitted through the liquid crystal display devices 14R, 14G and 14B are incident on a projection lens 16 via field lenses 18 respectively provided in the path of the light transmitted through each of the liquid crystal display devices 14R, 14G and 14B. In detail, the red sub light components are transmitted through the liquid crystal display device 14R and are incident on a dichroic mirror 13G'. The red sub light components are then transmitted through the dichroic mirror 13G'. The green sub light components transmitted through the liquid crystal display device 14G are also transmitted through the dichroic mirror 13G' and reflected. The red and green sub light components are then incident on and transmitted through a dichroic mirror 13B. The blue sub light components are transmitted through the liquid crystal display device 14B are reflected by another mirror 5. The blue sub light components are also incident on and are reflected by the dichroic mirror 13B. Thus, the sub light components of the RGB colors are combined and projected on a screen 17 via the projection lens 16.

Figure 9:
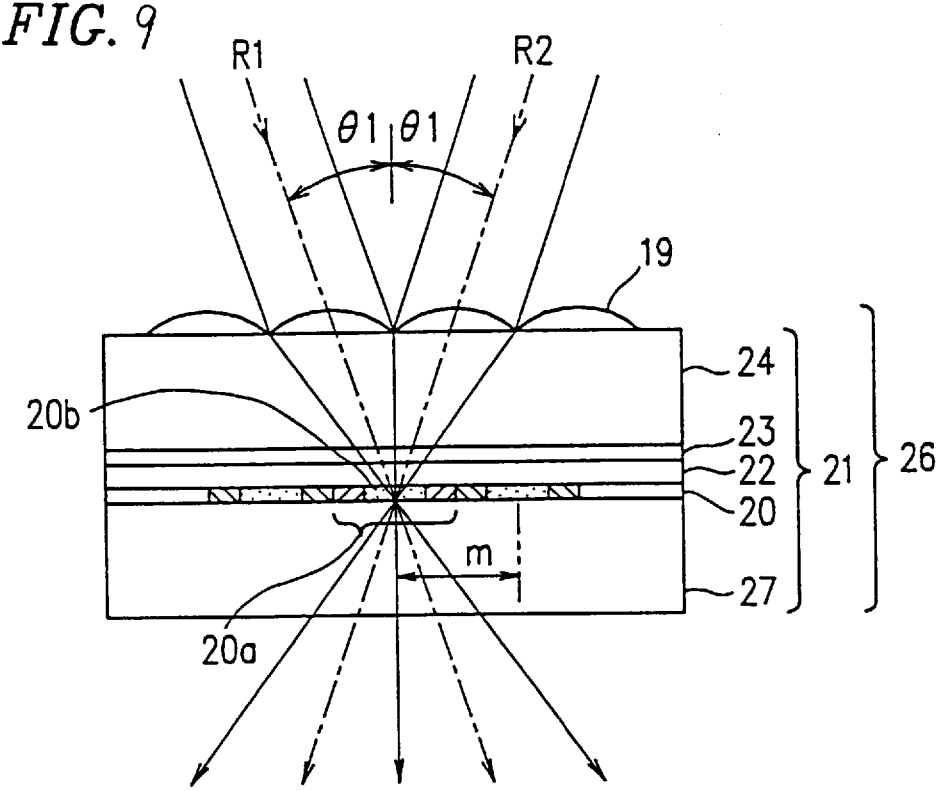
FIG. 9 is a cross-sectional view of a liquid crystal display device commonly used as liquid crystal display devices for red, green and blue in the liquid crystal color projector shown in FIG. 8.

FIG. 9 is a cross-sectional view of a liquid crystal display device 26 commonly used as liquid crystal display devices 14R, 14G and 14B in the liquid crystal color projector 10.

As shown in FIG. 9, the liquid crystal display device 26 includes a liquid crystal panel 21 and a microlens array 19 provided on a light incident surface of the liquid crystal panel 21. The liquid crystal panel 21 includes a pair of transparent substrates 24 and 27 and a liquid crystal layer 22 held between the transparent substrates 24 and 27. The transparent substrates 24 and 27 can be formed of glass or the like. The transparent substrate 24 has, on a surface thereof, a plurality of scanning electrodes 23 provided in stripes. The transparent substrate 27 has, on a surface thereof, a plurality of signal electrodes 20 provided in stripes. The scanning electrodes 23 and the signal electrodes 20 are arranged to form a matrix, namely, to intersect each other, in order to drive the liquid crystal layer 20 by duty driving. The areas surrounded by the scanning electrodes 23 and the signal electrodes 20, e.g., the areas where no scanning electrode 23 or no signal electrode 20 is formed, are pixel apertures 20b. The scanning electrodes 23 and the signal electrodes 20 are formed of a transparent conductive film. The liquid crystal color projector 10 is designed so that the light components transmitted through or reflected by the dichroic mirrors 13R, 13G and 13B are caused by the microlens array 19 to enter the pixel apertures 20b. The liquid crystal display device 26 further includes alignment films and at least one polarizer not shown in FIG. 9.

Also as shown in FIG. 9, the microlens array 19 has a plurality of microlenses. In this example, the microlens pitch is equal to the pixel pitch. The microlens array is arranged so that the borders between adjacent microlenses are offset from the borders between adjacent pixels 20a. As appreciated from FIG. 9, the borders of adjacent microlenses are directly above the centers of the pixels.

Figure 10:
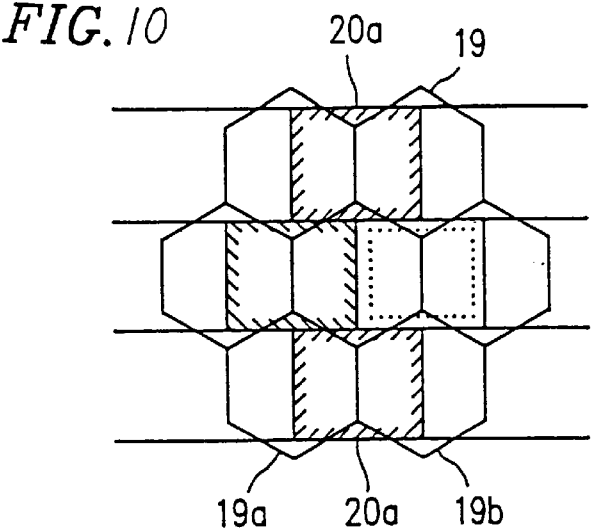
FIG. 10 shows the positional relationship of pixels and microlenses in the liquid crystal color projector shown in FIG. 8.

FIG. 10 shows the positional relationship of the pixel 20a and the microlenses of the microlens array 19. FIG. 10 shows a part of the liquid crystal panel and the microlens array 19 as seen looking along a normal to the microlens array 19. As appreciated from FIG. 10, each microlens has a hexagonal contour. The microlenses are arranged in a honeycomb-like manner. The square pixels 20a are arranged so that vertical borders of adjacent pixels in one horizontal line are offset from the vertical borders of adjacent pixels in the next horizontal line by half of the pixel pitch.

Referring to FIG. 9 again, the incident angle $\theta_1$ which is set so that two sub light components having the same wavelength, for example, red sub light components R1 and R2 which were incident on the microlens array 19 from different directions accurately enter the same pixel aperture 20b. Where the focal length of the microlens in the air is fu and the pixel pitch is m, the incident angle $\theta_1$ is given by expression (1).

$$\theta_1 = \tan^{-1}(m/2fu) \qquad (1)$$

The triangular prism 11 (FIG. 8) is provided so as to cause the two sub light components R1 and R2 to be incident on the liquid crystal panel 21 at the incident angles $\pm\theta_1$ with respect to the normal to the liquid crystal panel 21.

In such a structure, the two sub light components incident respectively on microlenses 19a and 19b (FIG. 10) from different directions toward the pixel 20a enter the pixel aperture 20b. Where the liquid crystal panel 21 is a typical 3:4-type 2-inch panel, the pixel pitch m is 65 μm, and the focal length fu of the microlens in the air is 450 μm, the incident angle $\theta_1$=about ±4.1° from expression (1).

Figure 11:
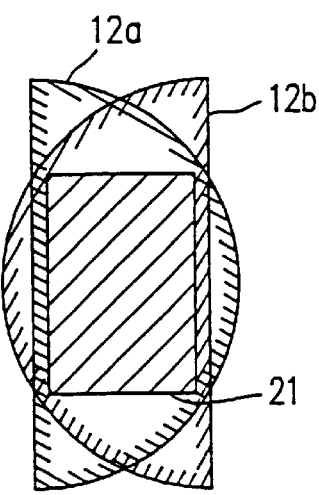
FIG. 11 shows the positional relationship of a liquid crystal panel and two sub light components incident on the liquid crystal panel obtained in the liquid crystal color projector shown in FIG. 8.

In the structure shown in FIG. 8, for example, the diameter of the light A is 80 mm, and distance L of the light path from the triangular prism 11 to each liquid crystal display device is about 200 mm. The two sub light components 12a and 12b are split by the triangular prism 11 so as to have a semicircular cross-section as shown in FIG. 11. The two sub light components are incident on the corresponding liquid crystal panel 21.

As can be appreciated, by causing the two sub light components 12a and 12b obtained by the triangular prism 11 to be incident on the liquid crystal panel 21 at the incident angles $\pm\theta_1$ with respect to the normal to the light incident surface of the liquid crystal display device, the effective light utilization efficiency can be improved to form brighter images. Such an improved effective light utilization efficiency is also advantageous for reducing the size of the liquid crystal color projector.

Figure 12:
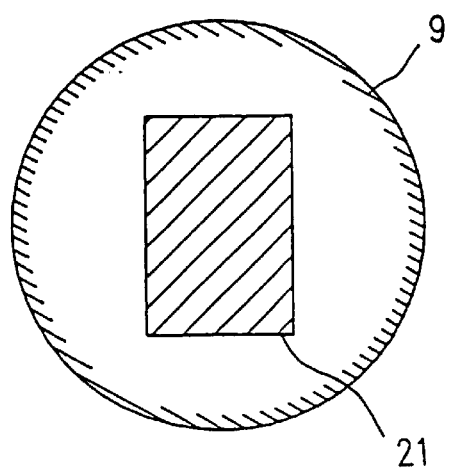
FIG. 12 shows the positional relationship of a liquid crystal panel and light which is incident thereon in a conventional manner.

FIG. 12 shows the relationship between shapes of a liquid crystal panel 21 and light 9 which is incident thereon without being split by a light shape dividing device such as a triangular prism. The area of the liquid crystal panel 21 is excessively small with respect to the cross-section of the light 9. In such a case, the ratio of the light which can enter the pixel apertures of the liquid crystal panel 21 is relatively small with respect to the entire amount of incident light, and thus the effective light utilization efficiency is reduced. As a result, the images projected on the screen 17 are excessively dark. The reason is as follows.

As described above, the light source 1 does not emit light from a point but from an area including a plurality of points.

Specifically, the light A obtained from the light source 1 is not ideal parallel light but is divergent. In other words, the central ray and the other rays of the light A are not completely parallel but have a certain divergence. When the inner diameter of the spherical mirror 2 is relatively large, the light A comes closer to being ideal parallel light; and when the inner diameter of the spherical mirror 2 is relatively small, the light A becomes less parallel. Thus, the diameter of a part of the light A which is sufficiently parallel for practical use is determined by the inner diameter of the spherical mirror 2. The inner diameter of the spherical mirror 2 cannot be determined freely but is determined so that the light incident on the liquid crystal panel is sufficiently parallel to fulfill the maximum tolerable angle specific to the type of liquid crystal panel. Accordingly, the diameter of the light A cannot be reduced merely because a smaller liquid crystal panel is used.

The microlens array 19 can be produced by, for example, one of the seven methods described in Japanese Laid-Open Patent Publication No. 4-60538.

(1) Refractive index distribution-type lenses are formed by selective ion diffusion.

(2) Plastic or glass lenses are formed by machining or molding.

(3) Convex lenses are formed utilizing the phenomenon that, when a certain type of photosensitive resin is exposed to obtain a prescribed pattern, unreacted monomer particles move from the non-exposed area to the exposed area, thereby swelling the exposed area.

(4) Convex lenses are formed by patterning a thermoplastic resin into a shape corresponding to the intended shape of the lenses as looking along a normal to the lenses, and then heating the resin to a temperature over the softening point to make the resin fluid and cause an edge of the resin pattern to sag.

(5) Convex lenses are formed by treating a photosensitive resin with proximity exposure (exposing the resin to light without causing the photomask to adhere to the resin). This causes the photosensitive resin to contain a product generated by the reaction with the light, utilizing the phenomenon that the edge of the resultant pattern of the resin is unclear.

(6) A photosensitive resin is irradiated by light having non-uniform intensity to provide the resin with a prescribed pattern of refractive index distribution in correspondence with the different intensities. The resin pattern in such a state is used as the lenses.

(7) Glass provided with photosensitivity by a silver salt is irradiated by light in a prescribed pattern. The resultant silver crystalline nuclei are grown by heat, and convex lenses are formed utilizing the contraction of the volume of the glass which accompanies the crystallization of the glass caused by the growth of the nuclei.

The microlens array 19 also can be formed by other methods.

(EXAMPLE 2)

Figure 13:
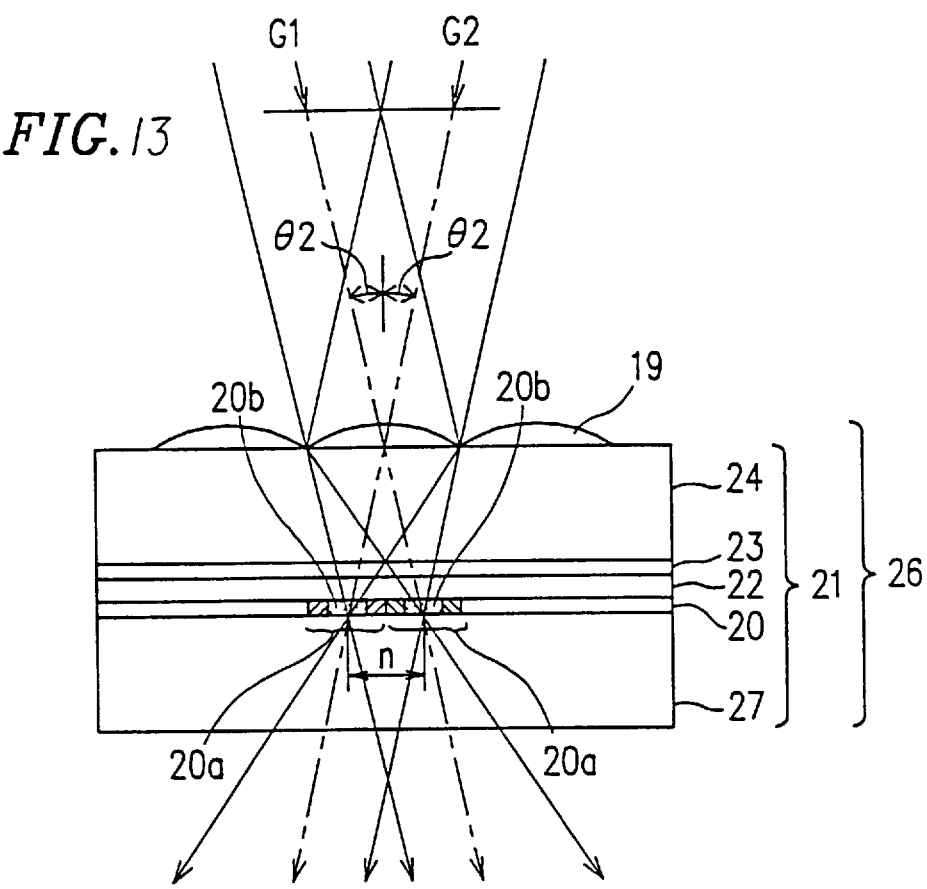
FIG. 13 is a cross-sectional view of a liquid crystal display device used in a liquid crystal color projector in a second example according to the present invention.

In a second example according to the present invention, each microlens of the microlens array 19 corresponds to two pixels 20a as shown in FIG. 13. A liquid crystal color projector in the second example has the same structure as that of the first example in the other points. Identical elements previously discussed with respect to FIGS. 8 through 11 will bear identical reference numerals therewith and the descriptions thereof will be omitted.

An incident angle $\theta_2$ is set so that two sub light components having the same wavelength, for example, green sub light components G1 and G2 are incident on the microlens array 19 from different directions and accurately enter two adjacent pixel apertures 20b, respectively. Where the focal length of the microlens in the air is fu and the pixel pitch is n, the incident angle $\theta_2$ is given by expression (2).

$$\theta_2 = \tan^{-1}(n/2fu) \quad (2)$$

The triangular prism 11 (FIG. 8) is provided so as to cause the two sub light components G1 and G2 to enter the pixel apertures 20b of the liquid crystal panel 21 at the incident angles $\pm\theta_2$ with respect to the normal to the liquid crystal panel 21.

Figure 14:
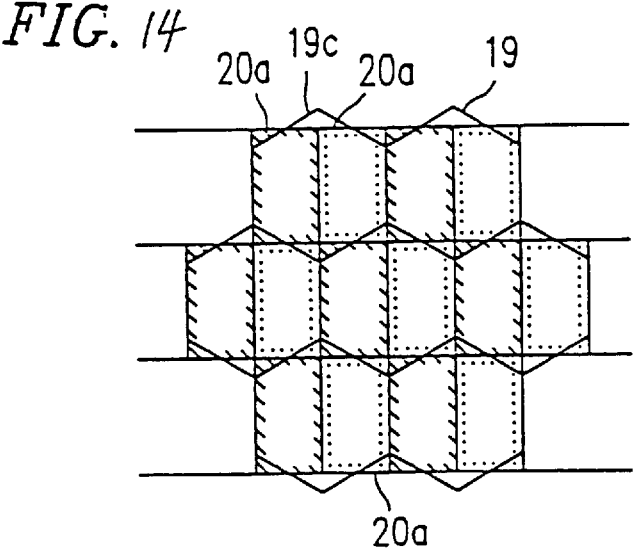
FIG. 14 shows the positional relationship of pixels and microlenses in the liquid crystal color projector in the second example.

FIG. 14 shows the positional relationship of the pixels 20a and the microlenses. FIG. 14 shows a part of the liquid crystal panel 21 and the microlens array 19 as seen looking along a normal to the microlens array 19. As can be appreciated from FIG. 14, each microlens has a hexagonal contour. The pixels 20a, which are rectangular, are arranged in a matrix, and the hexagonal microlenses 19c are arranged in a honeycomb-like manner. Two pixels 20a correspond to one microlens 19c. Two sub light components incident on the one microlens 19c from different directions enter the two pixel apertures 20b, respectively.

The shapes of the liquid crystal panel 21 and the two sub light components incident thereon have the relationship shown in FIG. 11.

As can be appreciated, by causing the two sub light components obtained by the triangular prism 11 to be incident on the liquid crystal panel 21 at the incident angles $\pm\theta_2$ with respect to the normal to the light incident surface of the liquid crystal panel 21, the effective light utilization efficiency can be improved to form brighter images. Such an improved effective light utilization efficiency is also advantageous for reducing the size of the liquid crystal color projector.

Figure 7:
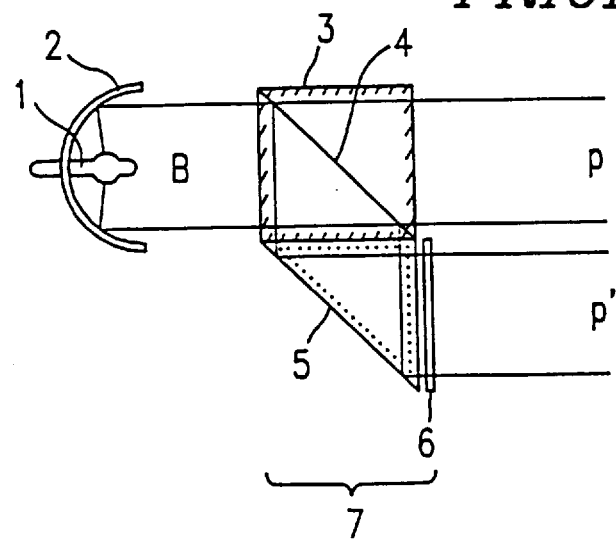
FIG. 7 is a schematic plan view of a system for dividing and combining polarized light used in a conventional liquid crystal color projector.

In the first and second examples, the system 7 shown in FIG. 7 can be used in lieu of the triangular prism 11 for dividing the light. Other systems can also be used. The two light components to be incident on the liquid crystal panel from different directions can be obtained by two illuminating systems each including a light source such as a metal halide lamp and a spherical mirror or the like.

The liquid crystal display device 26 can be driven using nonlinear devices such as transistors in lieu of using duty driving.

In third, fourth and fifth examples according to the present invention, a liquid crystal color projector including a single liquid crystal panel will be described. The liquid crystal panel modulates color components which are incident thereon at different incident angles in correspondence with the wavelengths. Each of the color components is divided into two light components. The two light components of each color enter the respective pixel aperture of the liquid crystal panel from different two directions. More specifically, two light components of the same color enter the respective pixel aperture so that the incident directions of the two light components make an angle defined in a plane including a "vertical direction" of the liquid crystal panel. The vertical direction of the liquid crystal panel is the direction of columns of the pixels arranged in a matrix in the liquid crystal panel. On the other hand, the RGB light components enter the respective pixel apertures so that the incident directions of the R and B light components are symmetric with respect to the incident direction of the G light components, which are incident normal to the light incident surface of the liquid crystal panel, in a plane perpendicular to the above-mentioned plane. Such a plane includes a "horizontal direction" of the liquid crystal panel, namely, the direction of rows of the pixels arranged in a matrix in the liquid crystal panel. Accordingly, each pixel aperture of the liquid crystal panel receives two light components of the corresponding color from two different directions.

By such a structure, the amount of light of each of the RGB colors entering each pixel aperture can be increased without increasing the brightness of the light source, or causing the light to be more parallel by reducing the size of the light source or enlarging the diameter of the pixel apertures of the liquid crystal panel.

In the following examples, a light component having a polarization direction that is absorbed in a conventional projector by the polarizer provided on the light incident side of the liquid crystal panel can be directed to the pixel apertures of the liquid crystal panel. The light passes through the half-wave plate and enters the pixel apertures at a prescribed angle with respect to a light component having a polarization direction that is transmitted through the polarizer. Thus, light which is wasted in a conventional projector can be fully utilized.

As in the first and second example, a microlens array is provided on a light incident surface of the liquid crystal panel. The pixel apertures and microlenses of the microlens array are positioned in relation to each other so that the two light components having the same wavelength form light spots in the pixel aperture of the corresponding color. Thus, the two light components can enter each pixel aperture. In this manner, the light emitted by the light source can be utilized with substantially no waste, thus increasing the amount of light which is transmitted through the liquid crystal display device.

Hereinafter, the present invention will be described by way of illustrative examples 3 through 5 with reference to the accompanying drawings.

(EXAMPLE 3)

A liquid crystal color projector including a single liquid crystal panel in a third example according to the present invention will be described with reference to FIGS. 15A through 17B.

Figure 15A:
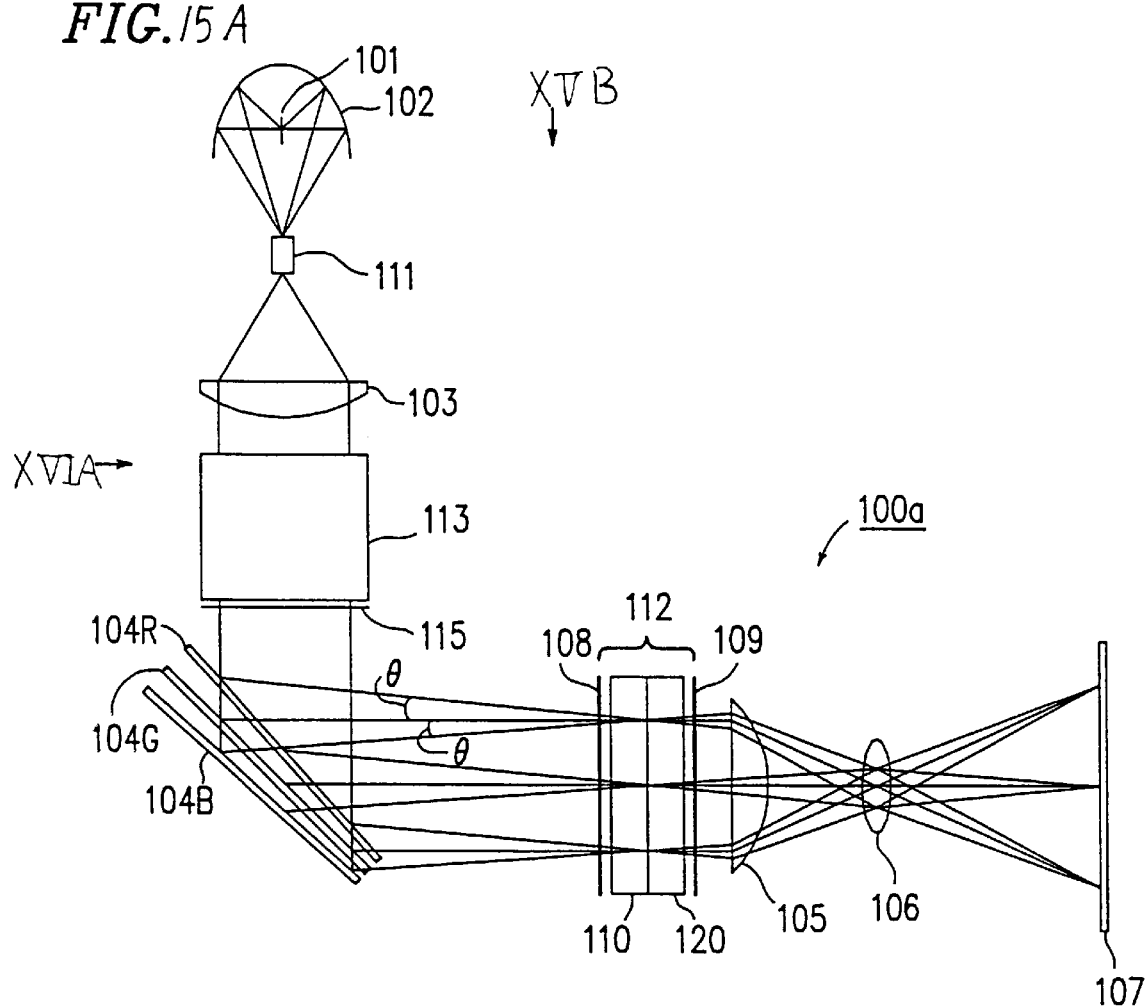
FIG. 15A is a schematic plan view of a liquid crystal color projector in a third example according to the present invention.
Figure 15B:
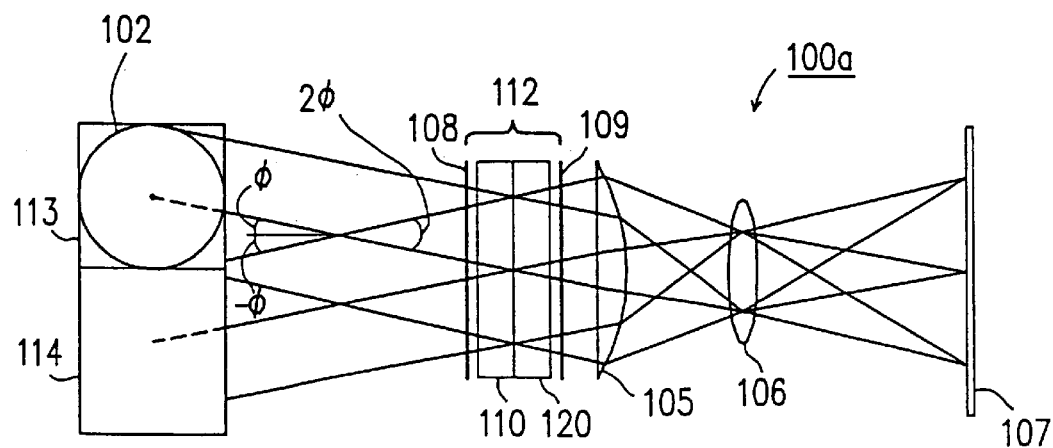
FIG. 15B is a rear view of the liquid crystal color projector as seen from the direction of arrow XVB in FIG. 15A.
Figure 16A:
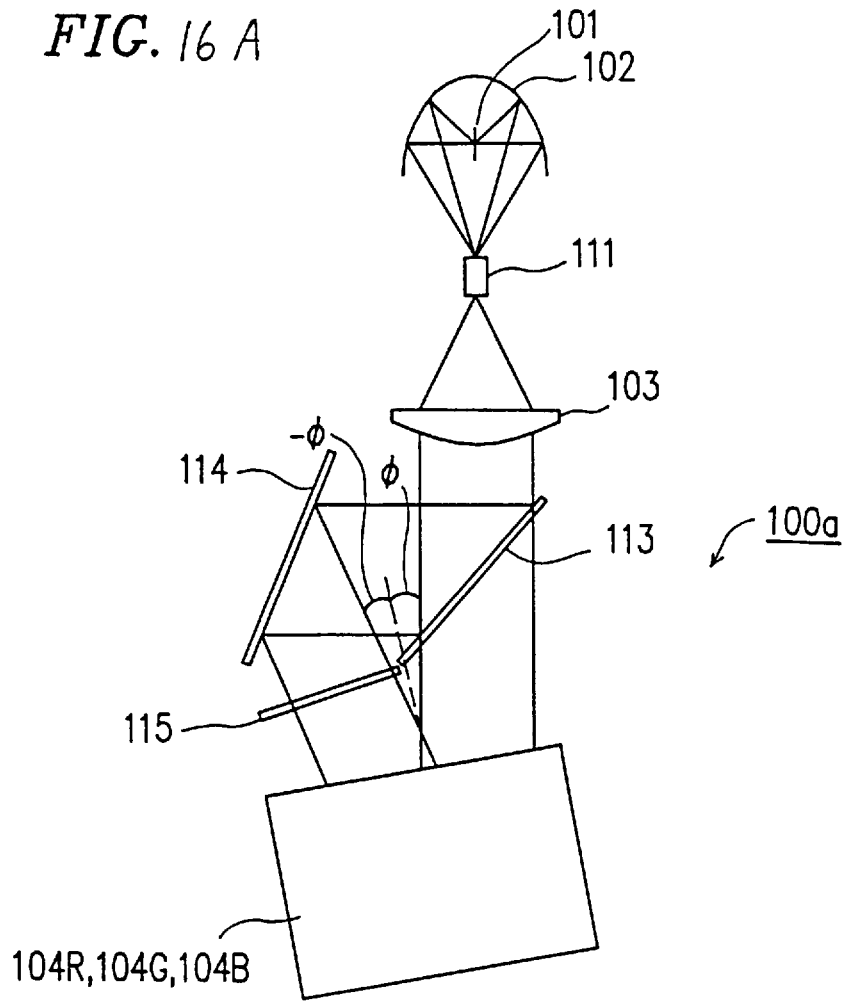
FIG. 16A is a side view of the liquid crystal color projector as seen from the direction of arrow XVIA shown in FIG. 15A.

FIG. 15A is a schematic plan view of a liquid crystal color projector 100a in the third example. FIG. 15B is a rear view thereof seen in the direction represented by arrow XVB. FIG. 16A is a side view thereof seen in the direction represented by arrow XVIA. Identical elements previously discussed with respect to FIGS. 8 through 11 will bear identical reference numerals therewith and the descriptions thereof will be omitted.

As shown in FIGS. 15A, 15B and 16A, the liquid crystal color projector 100a includes a single liquid crystal display device 112, and a light source 101 formed of a metal halide lamp having a power consumption of 250 W and an arc length of 3.0 mm. The light source 101 emits white light. The liquid crystal color projector 110a further includes a spheroid reflector 102 for reflecting the light emitted by the light source 101. The spheroid reflector 102 is located so as to have a first focal point at the position of the light source 101. The light reflected by the spheroid reflector 102 is collected at a second focal point thereof. The spheroid reflector 102 has a first focal length of 22 mm, a second focal length of 110 mm, and an effective diameter of 80 mm.

The liquid crystal color projector 100a further includes a polarization beam splitter 113, a condenser lens 103 and dichroic mirrors 104R, 104G and 104B. The polarization beam splitter 113 allows a linearly polarized light component to transmit therethrough and reflects a light component having a different polarization direction from that of the linearly polarized light component which can be transmitted through polarization beam splitter 113. In this example, a P-polarized light component is transmitted through and an S-polarized light component is reflected by the polarization beam splitter 113. Furthermore, a mirror 114 (FIGS. 15B and 16A) is provided below the polarization beam splitter 113 for reflecting the S-polarized light component so that the principal ray of the S-polarized light component makes an angle of 2φ with the principal ray of the P-polarized light component. A half-wave plate 115 is provided in the path of the S-polarized light component reflected by the mirror 114. The half-wave plate 115 rotates the plane of polarization of the S-polarized light component by 90° to turn the S-polarized light component into a P-polarized light component. The P-polarized light component obtained by the half-wave plate 115 and the P-polarized light component transmitted through the polarization beam splitter 113 are each divided into red, green and blue light components by the dichroic mirrors 104R, 104G and 104B. The light components of these three colors are incident on the liquid crystal display device 112.

Figure 1:
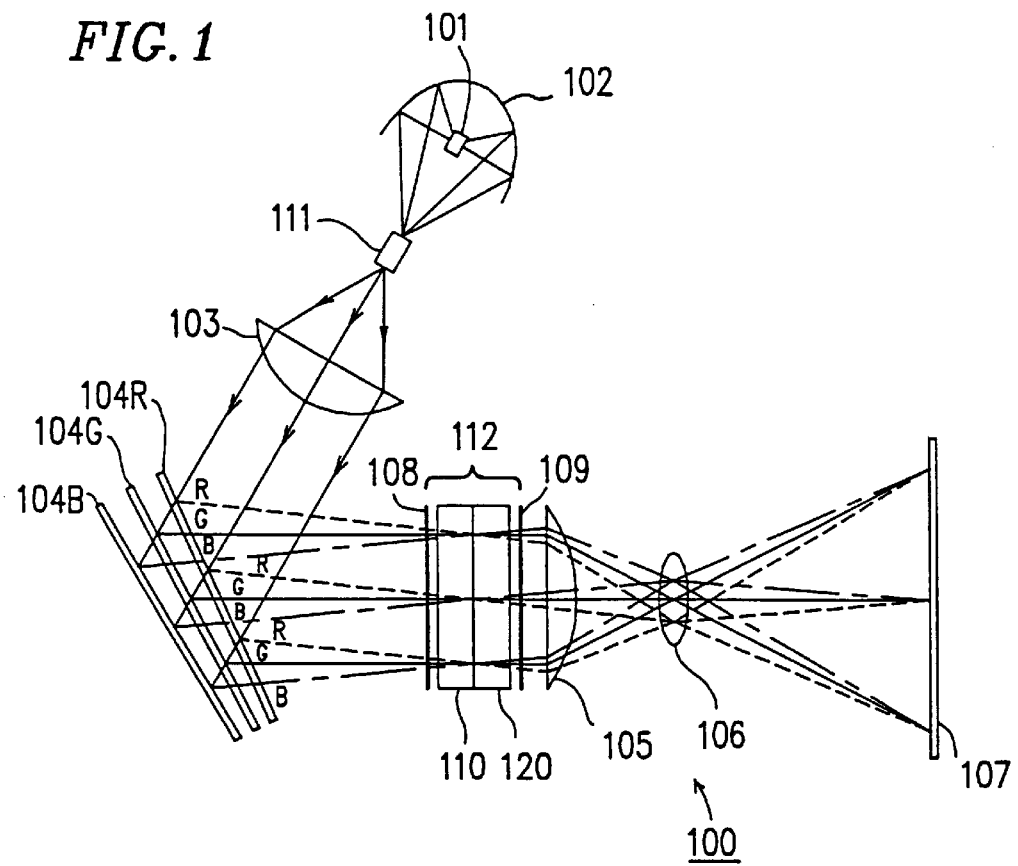
FIG. 1 is a schematic plan view of a conventional liquid crystal color projector.
Figure 2:
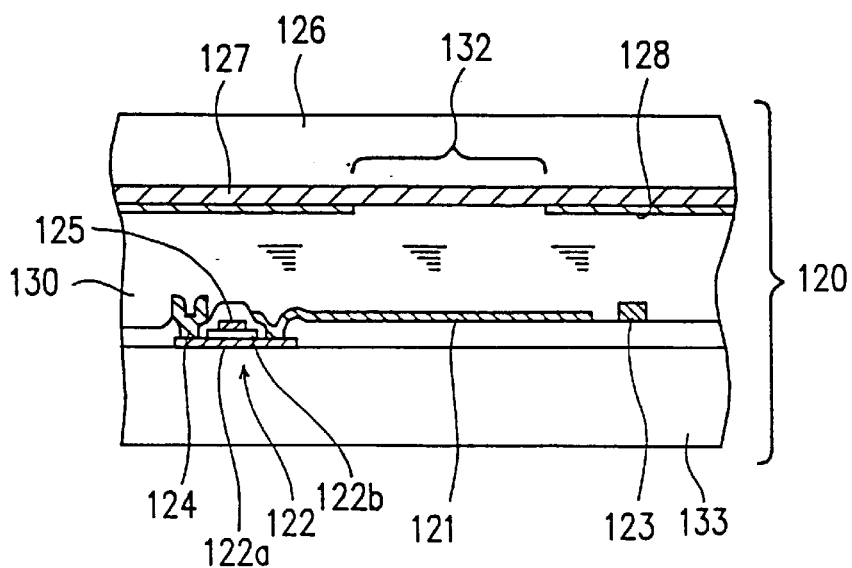
FIG. 2 is a cross-sectional view of a liquid crystal panel used in the liquid crystal color projector shown in FIG. 1.
Figure 3:
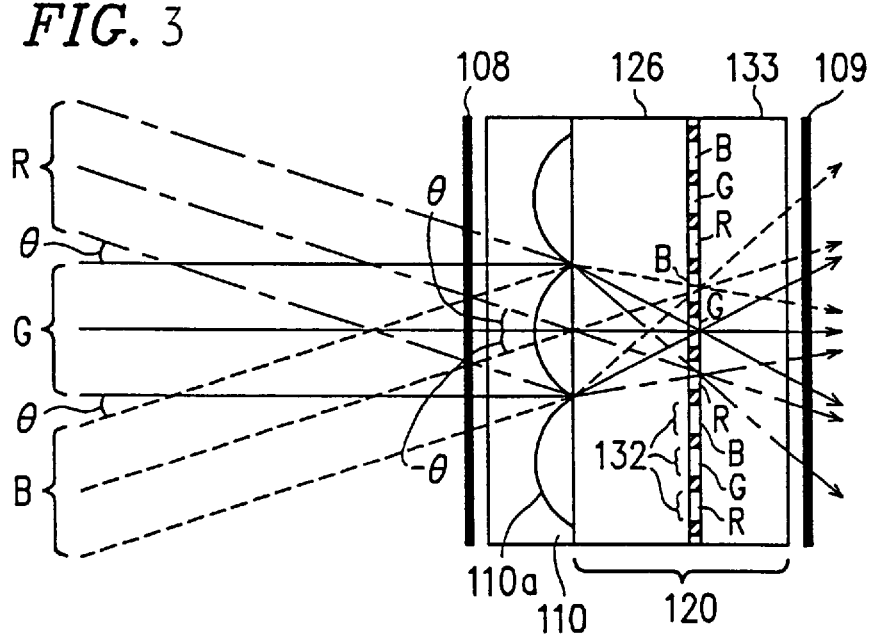
FIG. 3 is a cross-sectional view of the liquid crystal panel and a microlens array in the liquid crystal color projector shown in FIG. 1.
Figure 4:
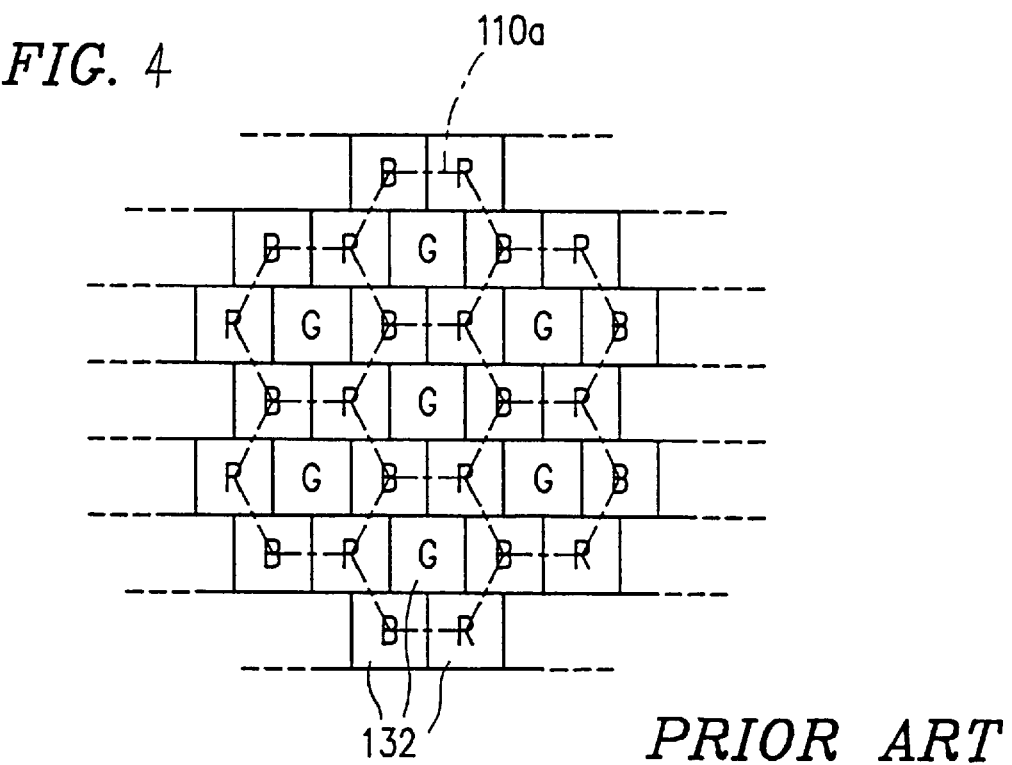
FIG. 4 shows the positional relationship of the microlenses and the pixel apertures in the liquid crystal color projector shown in FIG. 1.
Figure 5:
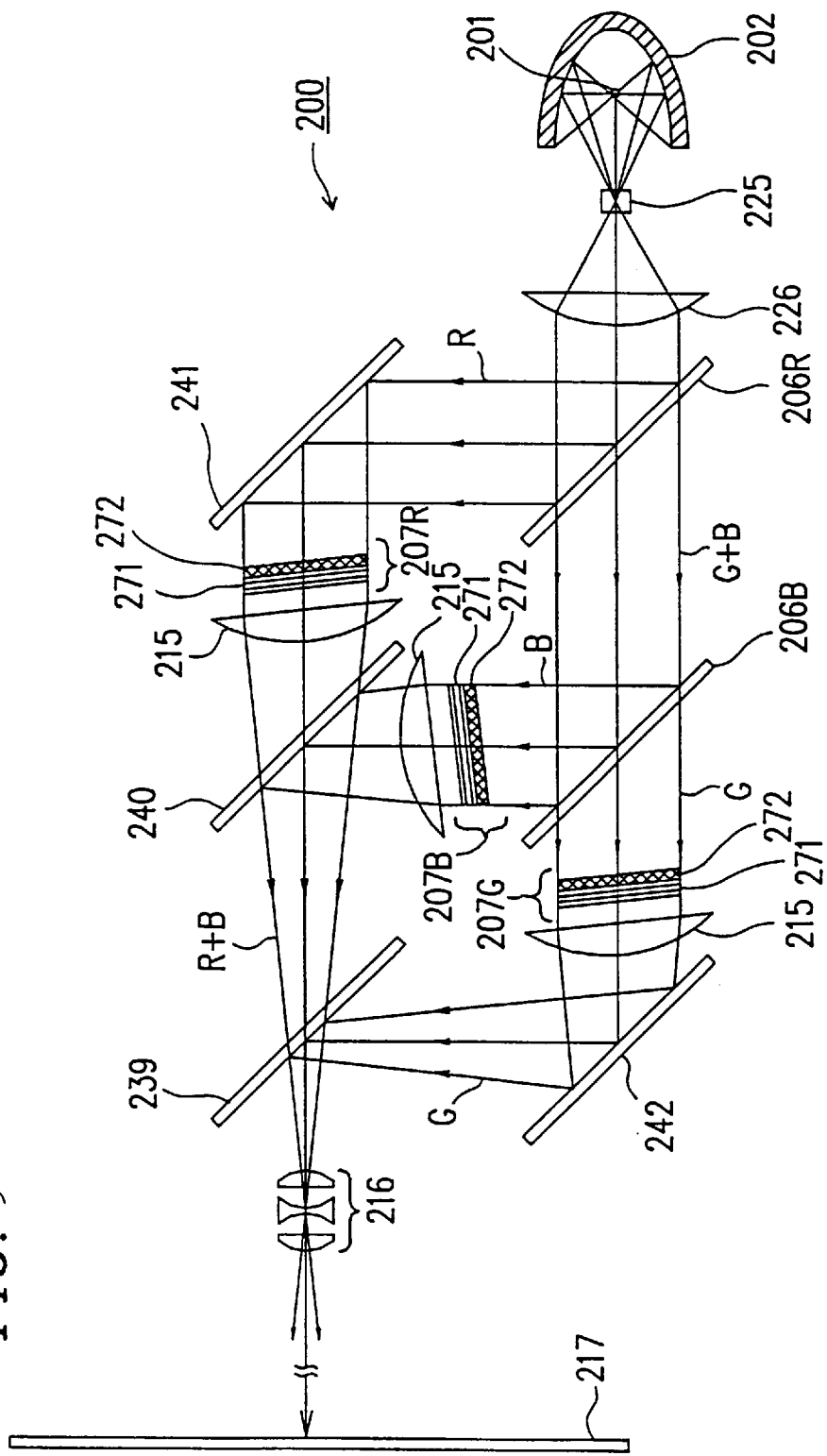
FIG. 5 is a schematic plan view of another conventional liquid crystal color projector.

The liquid crystal display device 112 has the same structure as the device shown in FIG. 2. Namely, the liquid crystal display device 112 includes a liquid crystal panel 120 and a microlens array 110. As shown in FIG. 2, the liquid crystal panel 120 includes a plurality of pixels, each including a pixel electrode 121, a TFT 122 and a storage capacitor. A light shielding layer 128 has a plurality of pixel apertures 132 in positional correspondence with the pixel electrodes 121. The liquid crystal display device 112 includes the polarizers 108 and 109 interposing the liquid crystal panel 120. The polarizer 108 allows only the P-polarized light to be transmitted therethrough.

The microlens array 110, which includes a plurality of microlenses 110a (FIGS. 17A and 17B), is formed by an ion exchange method. The microlens array 110 and the liquid crystal panel 120 are located so that optical axes of the microlenses 110a are normal to the light incident surface of the liquid crystal panel 120.

Figure 16B:
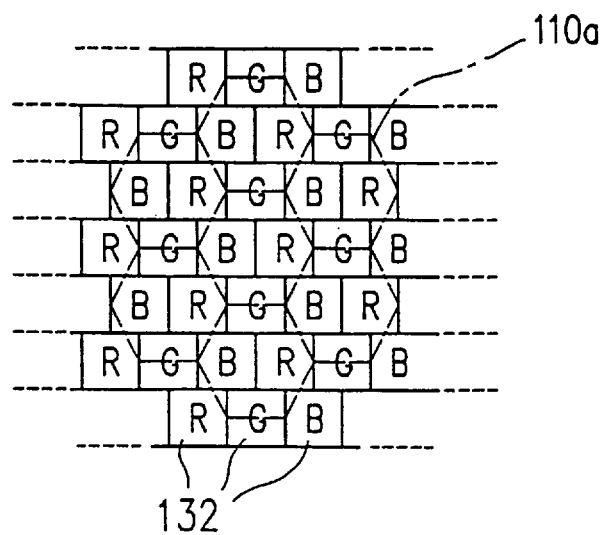
FIG. 16B shows the positional relationship of pixels and microlenses in the liquid crystal color projector shown in FIG. 15A.

FIG. 16B schematically shows the positional relationship of the microlenses 110a of the microlens array 110 and the pixels of the liquid crystal panel 120. In FIG. 16B, parts of the pixels which do not contribute to the display are not shown, and only the pixel apertures 132 are shown. In detail, the pixels corresponding to red, green and blue are arranged repeatedly in this order on each horizontal line of the display screen. FIG. 16B shows a part of the liquid crystal panel 120 and the microlens array 110 as seen looking along a normal to the microlens array 110. As can be appreciated from FIG. 16B, each microlens 110a has a hexagonal contour and the microlenses 110a are arranged in a honeycomb-like manner. The pixel apertures 132, which are square, are arranged so that the borders of adjacent pixel apertures in one horizontal line are offset from the borders of adjacent pixel apertures in the next horizontal line by half of the pixel pitch. The microlens array 110 is located so that the optical axis of each hexagonal microlens 110a is on the center of the border between the blue and red pixels. The positional relationship between the microlens 110a and the pixels are not limited to this relationship. For example, the optical axis of the microlens 110a can be on the center of the border between the red and green pixels, or on the center of the border between the green and blue pixels.

The liquid crystal color projector 110a operates in the following manner.

Light emitted by the light source 101 is reflected by the spheroid reflector 102 and collected at the second focal point of the spheroid reflector 102. The light then diverges with a uniform intensity after passing through an integrator 111 located in the vicinity of the second focal point and then is collimated by a is condenser lens 103. A P-polarized light component of the collimated light is transmitted through the polarization beam splitter 113. An S-polarized light component is reflected by the polarization beam splitter 113 in a prescribed direction in a plane which includes the direction in which the S-polarized light component is incident on the polarization, beam splitter 113 and the vertical direction of the liquid crystal display device 112. Such a plane corresponds to a plane parallel to the paper of FIG. 16A and will be referred to as a "vertical plane". The S-polarized light component is reflected by the mirror 114 in such a direction as to make an angle of 2φ with the P-polarized light component transmitted through the polarization beam splitter 113 in the vertical plane. Then, the S-polarized light component is converted into a P-polarized light component by passing through a half-wave plate 115.

The two P-polarized light components are each divided into RGB light components by the dichroic mirrors 104R, 104G and 104B. In detail, the red, green and blue light components are respectively reflected by the dichroic mirrors 104R, 104G and 104B in a plane which includes the horizontal direction of the liquid crystal display device 112 and which is perpendicular to the vertical plane. Such a plane will be referred to as the "horizontal plane". The red light component and the blue light component are each reflected to make an angle θ with respect to the green light component.

Figure 17A:
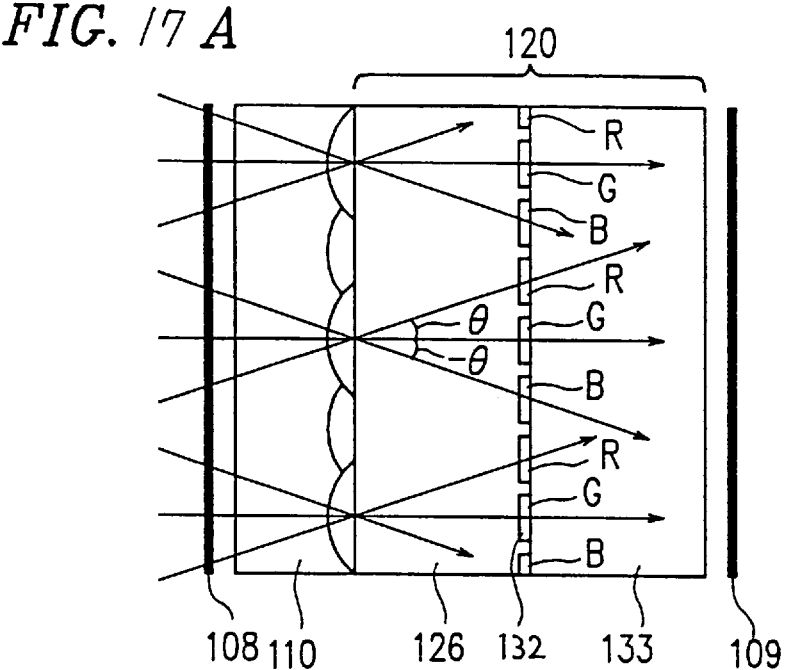
FIG. 17A shows three light components having different wavelengths which are incident on a liquid crystal display device of the liquid crystal color projector shown in FIG. 15A.
Figure 17B:
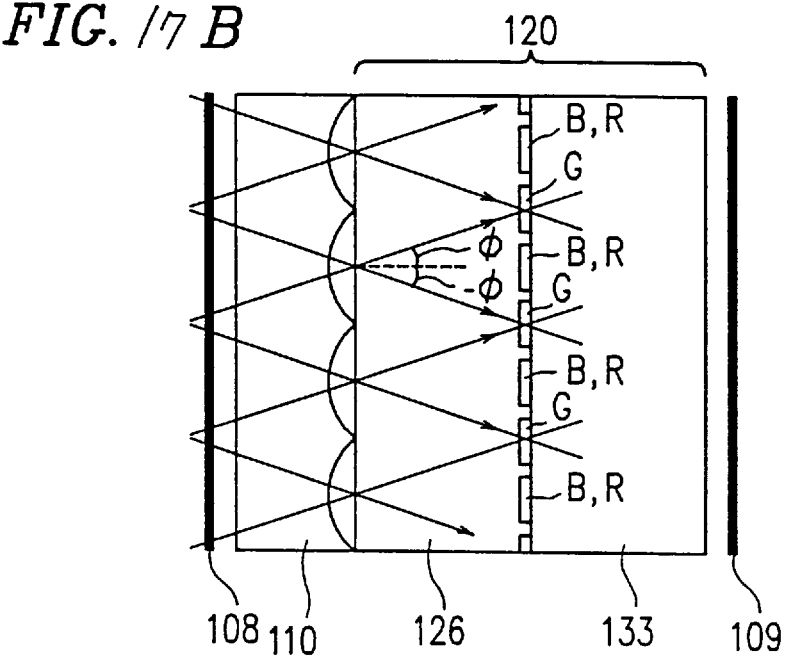
FIG. 17B shows two light components having the same wavelength which are incident on the liquid crystal display device shown in FIG. 17A.

Thus, a total of six light components enter pixel apertures 132 of the corresponding colors of the liquid crystal panel 120 through the polarizer 108 in six different directions. FIG. 17A shows the three light components having different wavelengths which enter the pixel apertures 132 in three different directions: along the normal to the light incident surface of the liquid crystal display device 112 (green) and in two directions having angles of ±θ with respect to the normal (red and blue). FIG. 17B shows the two light components having the same wavelength which enter the corresponding pixel aperture 132 in three different directions in the vertical plane at angles of ±φ with respect to the normal to the light incident surface of the liquid crystal display device 112. For simplicity, FIG. 17A shows only the principal ray of each light component of each color, and FIG. 17B shows only the principal ray of each of the two light components of green.

Considering both the vertical and horizontal planes, the six light components enter the pixel aperture 132 of the liquid crystal panel 120 through the polarizer 108 from six different directions in the following manner.

The two P-polarized light components of green enter in the direction of the optical axis of the microlens in the horizontal plane and at angles of ±φ in the vertical plane with respect to the optical axis, and form light spots in the respective pixel apertures 132 for green.

The two P-polarized light components of red and blue enter at angles of ±θ in the horizontal plane with respect to the green light components and at angles of ±φ in the vertical plane with respect to the optical axis of the microlens, and form light spots in the respective pixel apertures 132 for red and blue. The pixel aperture in which the light spot is formed by each light component corresponds to the microlens through which the light component is transmitted.

Then the light components transmitted through the liquid crystal display device 112 are projected in a superimposed manner on a screen 107 through a polarizer 109, a field lens 105 and a projection lens 106. Thus, a multi-color image is displayed on the screen 107.

Hereinafter, a method for setting the angles φ and θ will be described using a 3-inch panel as an example.

In a typical 3-inch panel, the pixel pitch m is 100 $\mu$m in both vertical and horizontal directions, the size of the pixel aperture 132 is 50 $\mu$m (vertical)×70 $\mu$m (horizontal), and the number of pixels is 450 (vertical)×600 (horizontal). Where the focal length of the microlens array 110, which is based on the thickness of the counter substrate of the liquid crystal display device 112, is 0.7 mm (1.1 mm (thickness)/1.53 (refractive index)), the light component entering the pixel aperture 132 for green in the horizontal plane (FIG. 17A) including the optical axis of the microlens needs to be as substantially parallel as $\pm\tan^{-1}(35/720)=\pm 2.8°$.

The principal rays of the red and blue light components enter the corresponding pixel apertures at angles of $\pm\tan^{-1}(100/720)=7.9°$ with respect to the principal ray of the green light component. The tolerable incident angle is $\pm\tan^{-1}((100+35)/720)$ to $\tan^{-1}((100-35)/720)=\pm(10.6°$ to $5.2°)$.

In other words, the tolerable incident angle of the light component having a principal ray which is inclined by θ=±8° with respect to the optical axis of the microlens in the horizontal plane is ±2.7.

In the vertical plane (FIG. 17B), the principal rays of the two light components of each color enter the corresponding pixel apertures at angles of $\pm\tan^{-1}(100/720)=\pm 7.9°$ with respect to the principal ray of the green light component. The tolerable incident angle is $\pm\tan^{-1}((100+25)/720)$ to $\tan^{-1}((100-25)/720)=\pm(9.8°$ to $5.9°)$.

In other words, the tolerable incident angle of the light component having a principal ray which is inclined by φ=±7.9° with respect to the optical axis of the microlens in the horizontal plane is ±(1.9° to (−2.0°)).

In accordance with the structure of the liquid crystal color projector 100a in the third example, the P-polarized light component transmitted through the polarization beam splitter 113 enters the corresponding pixel aperture 132 of the liquid crystal panel 120 at an angle of φ (e.g., 7.9°) with respect to the optical axis of the microlens in, for example, the vertical plane. The S-polarized light component of the same color, which is wasted in the conventional projector, is converted into another P-polarized light component and enters the same pixel aperture of the liquid crystal panel 120 at an angle of −φ (e.g., −7.9°) with respect to the optical axis of the microlens in, for example, the horizontal plane. The two P-polarized light components enter in the same amount. Thus, the brightness of the resultant image is raised to twice as high as is obtained in the conventional liquid crystal color projector.

The S-polarized light component is prevented from being shielded or absorbed by the polarizer and converted into heat. Accordingly, a conventional problem that the polarizer is melted or burned by the heat is solved.

(EXAMPLE 4)

A liquid crystal projector including a single liquid crystal panel in a fourth example according to the present invention will be described with reference to FIGS. 18A through 18C.

Figure 18A:
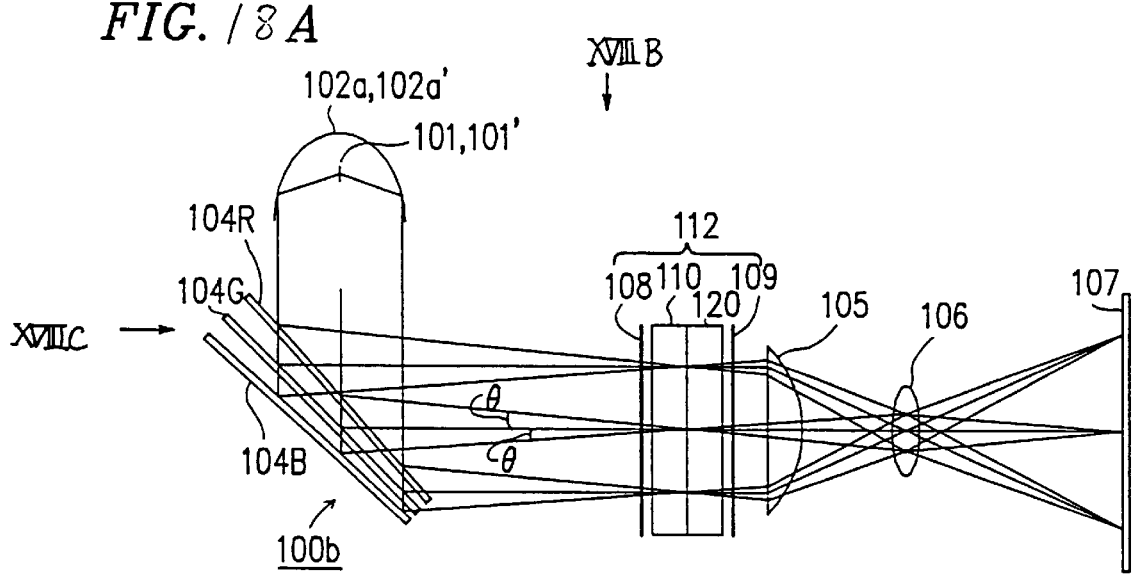
FIG. 18A is a schematic plan view of a liquid crystal color projector in a fourth example according to the present invention.
Figure 18B:
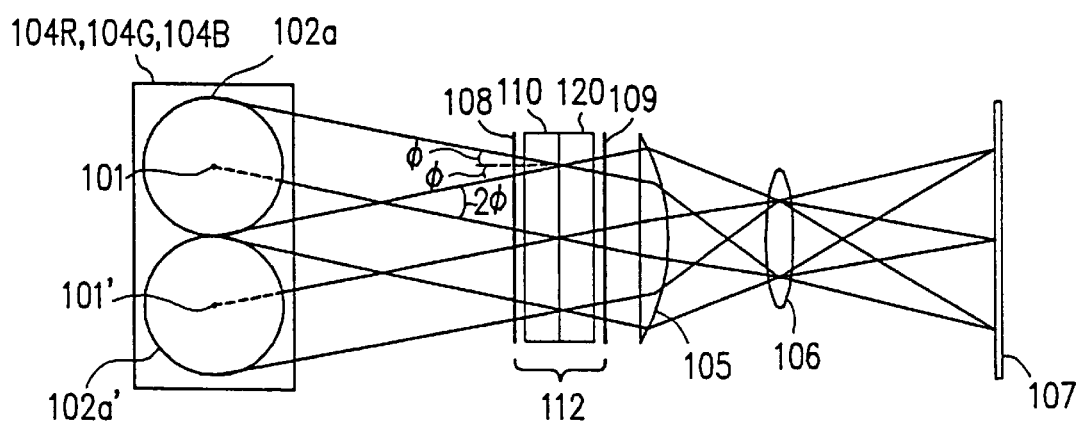
FIG. 18B is a rear view of the liquid crystal color projector as seen in the direction of arrow XVIIIB in FIG. 18A.
Figure 18C:
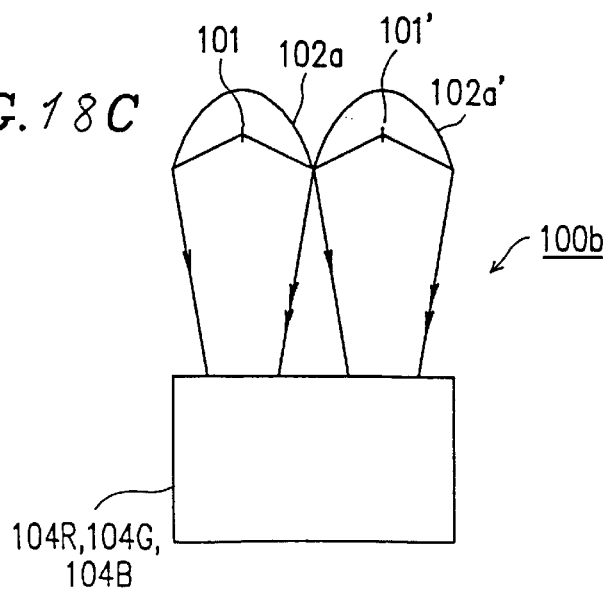
FIG. 18C is a side view of the liquid crystal color projector as seen in the direction of arrow XVIIIC in FIG. 18A.

FIG. 18A is a schematic plan view of a liquid crystal color projector 100b in the fourth example. FIG. 18B is a rear view thereof seen in the direction represented by arrow XVIIIB. FIG. 18C is a side view thereof seen in the direction represented by arrow XVIIIC. Identical elements previously discussed with respect to FIGS. 15A through 17B will bear identical reference numerals therewith and the descriptions thereof will be omitted, As shown in FIGS. 18A, 18B and 18C, the liquid crystal color projector 100b includes a single liquid crystal display device 112, and two light sources 101 and 101' each formed of a metal halide lamp having a power consumption of 250 W and an arc length of 3.0 mm. The light sources 101 and 101' emit white light. The liquid crystal color projector 100b further includes paraboloidal mirrors 102a and 102a'. The paraboloidal mirrors 102a and 102a' are located so as to have a focal point at the position of the light sources 101 and 101', respectively. The paraboloidal mirrors 102a and 102a' both have a focal length of 22 mm and an effective diameter of 80 mm.

The liquid crystal display device 112 has the same structure as in the third example. The pixels and the microlenses of the microlens array 110 have the positional relationship shown in FIG. 16B.

The liquid crystal color projector 100b operates in the following manner.

A first light component emitted by the light source 101 and a second light component emitted by the light source 101' are respectively reflected by the paraboloidal mirrors 102a and 102a' and collimated. As in the third example, principal rays of the first and the second light components make an angle of $2\phi$ (FIG. 18B) in the vertical plane defined in the third example, The two light components are each divided into RGB light components by dichroic mirrors 104R, 104G and 104B. In detail, the red, green and blue light components are respectively reflected by the dichroic mirrors 104R, 104G and 104B in a horizontal plane defined in the third example. The red light component and the blue light component are each reflected to make an angle $\theta$ (FIG. 18A) with respect to the green light component.

Thus, a total of six light components enter the corresponding pixel apertures 132 of the corresponding colors of the liquid crystal panel 120 through the polarizer 106 in six different directions as in the third example. In the vertical plane, the two light components having the same wavelength enter at angles of $\pm\phi$ with respect to the normal to the light incident surface of the liquid crystal display device 112 (i.e., in the direction of the optical axis of the microlens). In the horizontal plane, the three light components having different wavelengths enter in three different directions: in the normal to the light incident surface of the liquid crystal display device 112 (green) and in two directions having angles of $\pm\theta$ with respect to the normal (red and blue).

The incident angles $\phi$ in the vertical plane and the incident angles $\theta$ in the horizontal plane of the light components of each color are set so that a light spot is formed in the pixel aperture of the corresponding color of the liquid crystal panel 120 as in the third example.

Among the first and the second light components of the RGB colors which are incident on the liquid crystal display device 112, S-polarized light components are absorbed by the polarizer 108 as in the fourth example. Only P-polarized light components enter the pixel apertures 132 of the liquid crystal display panel 120 through the microlens array 110.

Considering both the vertical and horizontal planes, the six light components enter the corresponding pixel apertures 132 of the liquid crystal panel 120 in six different directions in the following manner.

The two light components of green enter in the direction of the optical axis of the microlens in the horizontal plane and at angles of $\pm\phi$ in the vertical plane with respect to the optical axis, and form light spots in the corresponding pixel apertures for green.

The two light components of red and blue enter at angles of $\pm\theta$ in the horizontal plane with respect to the green light components and at angles of $\pm\phi$ in the vertical plane with respect to the optical axis of the microlens, and form light spots in the respective pixel apertures for red and blue. The pixel aperture in which the light spot is formed by each light component corresponds to the microlens through which the light component is transmitted.

Then, the light components modulated by passing through the liquid crystal panel 120 are projected on a screen 107 through a polarizer 109, a field lens 105 and a projection lens 106. Thus, a multi-color image is displayed on the screen 107.

In accordance with the structure of the liquid crystal color projector 100b in the fourth example, the light component from one light source enters the corresponding pixel apertures 132 of the liquid crystal display device 112 at an angle of $\phi$ with respect to the optical axis of the microlens in, for example, the vertical plane. The light component from the other light source of the same color enters the same pixel apertures of the liquid crystal panel 120 at an angle of $-\phi$ with respect to the optical axis of the microlens in, for example, the vertical plane. The two light components enter in the same amount. Thus, the brightness of the resultant image is raised to twice as high as is obtained in the conventional liquid crystal color projector, in which only one of the two linearly polarized light components having planes of polarization perpendicular to each other is used.

In the fourth example, the light sources 101 and 101' each have a power consumption of 250 W and an arc length of 3.0 mm. In the case where two light sources are used in this example, one of the light sources can have a smaller power consumption of 125 W and a shorter arc length of 1.5 mm. In that case, the paraboloidal mirrors 102a and 102a' can be smaller (for example, focal length; 11 mm; effective diameter: 40 mm). By using such smaller elements, the light components can have a smaller diameter while being as parallel as the light components obtained by larger elements. Thus, the lenses and other elements in the optical system can be made smaller to reduce the size of the projector. The production cost can also be lowered.

(EXAMPLE 5)

A liquid crystal projector including a single liquid crystal panel in a fifth example according to the present invention will be described with reference to FIGS. 19 and 20.

Figure 19:
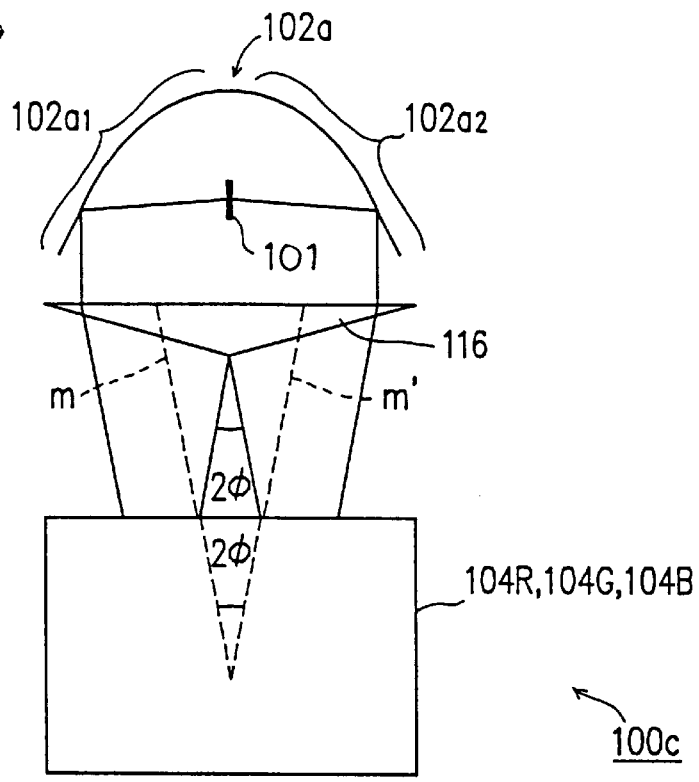
FIG. 19 is a partial side view of a liquid crystal color projector in a fifth example according to the present invention.

FIG. 19 is a partial side view of a liquid crystal color projector 100c in the fifth example. Identical elements previously discussed with respect to FIGS. 15A through 17B will bear identical reference numerals therewith and the descriptions thereof will be omitted.

A light source 101 for emitting white light is formed of a metal halide lamp having a power consumption of 250 W and an arc length of 3.0 mm. A paraboloidal mirror 102a is located so as to have a focal point at the position of the light source 101. The paraboloidal mirror 102a has a focal length of 22 mm and a rectangular opening having an effective size of 80 mm×160 mm. A wedge prism 116 is located in the path of the light reflected by the paraboloidal mirror 102a. The wedge prism 116 is provided for dividing the light from the paraboloidal mirror 102a into a first light component and a second light component which make an angle of 2φ in the vertical plane defined in the third example.

The liquid crystal color projector 100c has the same structure as in the third example in the other points.

The liquid crystal display device 112 has the same structure as in the third example. The pixels of the liquid crystal panel 120 and the microlenses of the microlens array 110 have the positional relationship shown in FIG. 16B.

The liquid crystal color projector 100c operates in the following manner.

Light from the light source 101 is reflected by the paraboloidal mirror 102a to be collimated. The collimated light is divided into a first light component and a second light component by the wedge prism 116. In detail, a principal ray m of the first light component from an area 102a1 of the paraboloidal mirror 102a and a principal ray m' of the second light component from an area 102a2 of the paraboloidal mirror 102a make an angle of 2φ, which is equal to the angle made by the two light components directed to the dichroic mirrors in the third example.

The first and the second light components are divided into RGB light components by the dichroic mirrors 104R, 104G and 104B respectively for reflecting light of prescribed wavelengths. The red and blue light components are respectively inclined by angle ±θ with respect to the green light component.

Thus, a total of six light components enter the corresponding pixel apertures 132 of the corresponding colors of the liquid crystal panel 120 through the polarizer 108 as in the third example. In the vertical plane, the two light components having the same wavelength enter at angles of ±φ with respect to the normal to the light incident surface of the liquid crystal display device 112 (i.e., in the direction of the optical axis of the microlens). In the horizontal plane, the three light components having different wavelengths enter in three different directions: along the normal to the light incident surface of the liquid crystal display device 112 (green) and in two directions having angles of ±θ with respect to the normal (red and blue).

The incident angles φ in the vertical plane and the incident angles θ in the horizontal plane of the light components of each color are set so that a light spot is formed in the pixel aperture of the corresponding color of the liquid crystal panel 120.

Among the first and the second light components of the RGB colors which are, incident on the liquid crystal display device 112, S-polarized light components are absorbed by the polarizer 108. Only P-polarized light components enter the pixel aperture 132 of the liquid crystal panel 120 through the microlens array 110, Considering both the vertical and horizontal planes, the six light components enter the pixel apertures 132 of the liquid crystal panel 120 in the following manner.

The two light components of green enter in the direction of the optical axis of the microlens in the horizontal plane and at angles of ±φ in the vertical plane with respect to the optical axis, and form light spots in the corresponding pixel for green.

The two light components of red and blue enter at angles of ±θ in the horizontal plane with respect to the green light components and at angles of ±φ in the vertical plane with respect to the optical axis of the microlens, and form light spots in the respective pixel apertures for red and blue. The pixel aperture in which the light spot is formed by each light component corresponds to the microlens through which the light component is transmitted.

Then, the light components is modulated by passing through the liquid crystal panel 120 are projected on a screen 107 (FIG. 18A) through a polarizer 109, a field lens 105 and a projection lens 106. Thus, a multi-color image is displayed on the screen 107.

In accordance with the structure of the liquid crystal color projector 100c in the fifth example, the light component from the area 102a1 of the paraboloidal mirror 102a enters the corresponding pixel apertures 132 of the liquid crystal panel 120 at an angle of φ with respect to the optical axis of the microlens in, for example, the vertical plane. The light component from another area 102a2 of the paraboloidal mirror 102a enters the same pixel apertures of the liquid crystal panel 120 at an angle of −φ with respect to the optical axis of the microlens in, for example, the vertical plane. The two light components enter in the same amount. Thus, the brightness of the resultant image is raised to twice as high as obtained in the conventional liquid crystal color projector, in which only one of the two linearly polarized light components having planes of polarization perpendicular to each other is used.

The structure of the optical system of the liquid crystal color projector 100c is simpler than that of the liquid crystal color projectors in the third and fourth examples, and includes a fewer number of optical elements. Thus, the size and the production cost of the liquid crystal color projector can be reduced.

In the fifth example, the wedge prism 116 is used for obtaining two parallel light components which have optical axes making an angle of 2φ. Such parallel light components can be also obtained by other systems.

Figure 20:
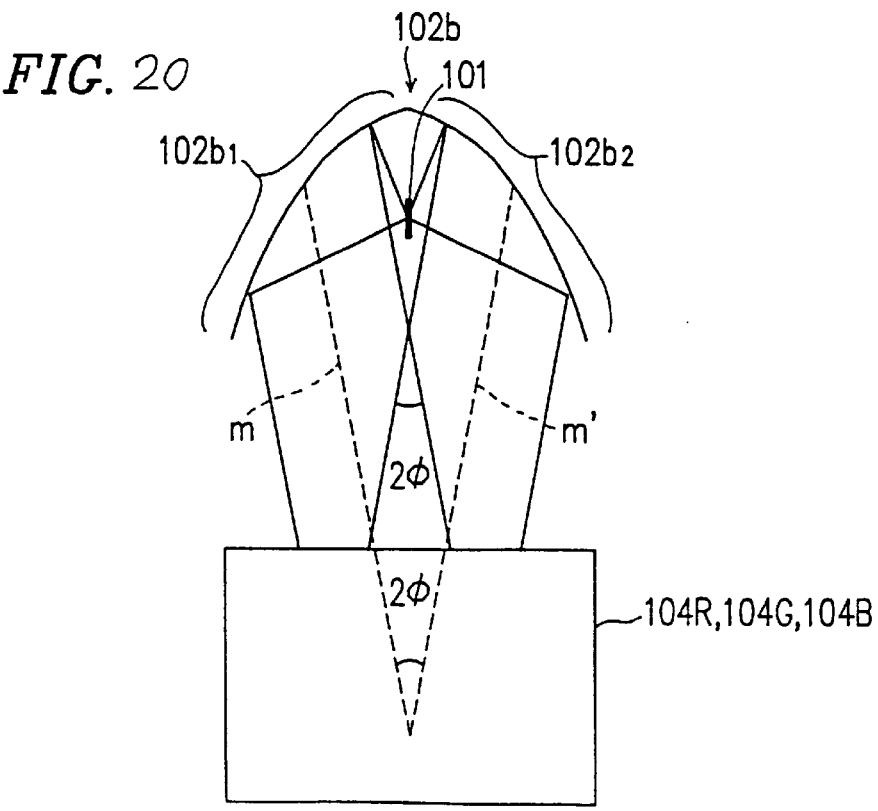
FIG. 20 is a partial side view of a liquid crystal color projector in a modification of the fifth example according to the present invention.

FIG. 20 shows one such system. A paraboloidal mirror 102b has a shape which is obtained by superimposing two shapes. One of the two shapes is obtained by rotating the paraboloidal mirror 102a (FIG. 19) around the light source 101 clockwise at a certain angle, and the other shape is obtained by rotating the paraboloidal mirror 102a around the light source 101 counterclockwise at the same angle. From the paraboloidal mirror 102b, the principal ray m of a light component from an area 102b1 of the paraboloidal mirror 102b and the principal ray m' of another light component from an area 102b2 of the paraboloidal mirror 102b make an angle of 2φ.

In such a structure, the two parallel light components making an angle of 2φ can be obtained without using additional optical element such as a wedge prism. Thus, the size and the production cost of the liquid crystal color projector can be further reduced.

In sixth, seventh and eighth examples according to the present invention, a liquid crystal color projector including three liquid crystal panels will be described. The liquid crystal color projector includes a light component generation section for providing the RGB colors to the liquid crystal panels. By the light component generation section, a plurality of light components in the same wavelength range enter the pixel apertures of each liquid crystal panel from different directions. Due to such a structure, a plurality of light components can enter each pixel aperture of the liquid crystal panels in a superimposed manner. Thus, the amount of light entering each pixel aperture is increased compared to the case where the light components enter the pixel apertures from one direction, thus increasing the brightness of the image displayed.

For example, the cross-section of light incident on the pixel aperture can be enlarged in order to obtain a brighter image. However, if the light component is incident on the liquid crystal panel in one direction, the amount of light which cannot enter the pixel apertures increases. In the case where the light is divided into a plurality of light components and caused to be incident on the liquid crystal panel in a plurality of directions, substantially all the light having the enlarged cross-section can enter the pixel apertures as long as the light is divided into a plurality of light components having a cross-section sufficiently small to enter the pixel aperture. Thus, the part of light which is wasted in a conventional projector can be utilized.

Microlenses of a microlens array provided on the light incident surface of the liquid crystal panel can be arranged so that each microlens corresponds to a plurality of adjacent pixel apertures and so that a plurality of light components in the same wavelength range which are incident on the microlenses at different incident angles enter different pixel apertures. Thus, a plurality of light components in the same wavelength range from different directions can enter the respective pixel apertures substantially without any waste. Furthermore, since each microlens corresponds to a plurality of pixel apertures, the size of each microlens can be larger than the size of each pixel aperture. The optical characteristics of the microlens can be improved in this manner.

The light component generation section includes an optical member which divides light emitted from the light source into a plurality of light components. For example, a pair of fly's eye lenses each of which includes a plurality of convex lenses can be used as the optical member. The fly's eye lens is designed so that the optical axes of the convex lenses are arranged in a pattern similar to the pattern in which centers of a prescribed number of adjacent pixel apertures are arranged. By such arrangement, principal rays of the light components from each convex lens of the fly's eye lens cross one another on the light incident surface of the liquid crystal display device and enter the pixel apertures through the corresponding microlens.

In lieu of using the optical member described above, as a reflecting member for directly receiving the light emitted by the light source, a paraboloidal mirror for reflecting and collecting the light can also be used. Such a paraboloidal mirror has a different shape from that of a generally used paraboloidal mirror for reflecting light from the light source to collimate it. More specifically, such a paraboloidal mirror includes a plurality of surfaces defined by planes including symmetrical axes of the paraboloidal mirror. The plurality of surfaces are inclined towards the optical axis of the paraboloidal mirror more than in a general paraboloidal mirror, namely, a paraboloidal mirror having a shape for reflecting and collimating the light. By using such a paraboloidal mirror, the principal rays of the light components from the plurality of surfaces are superimposed on the surface of the liquid crystal display device. When such a paraboloidal mirror is used, light components can enter each of the plurality of pixel apertures of the liquid crystal panel from a plurality of directions without providing additional optical elements such as a fly's eye lens or a wedge prism.

Hereinafter, the present invention will be described by way of illustrative examples 6 through 8 with reference to the accompanying drawings.

(EXAMPLE 6)

A liquid crystal color projector including three liquid crystal panels in a sixth example according to the present invention will be described with reference to FIGS. 21 through 28F.

Figure 21:
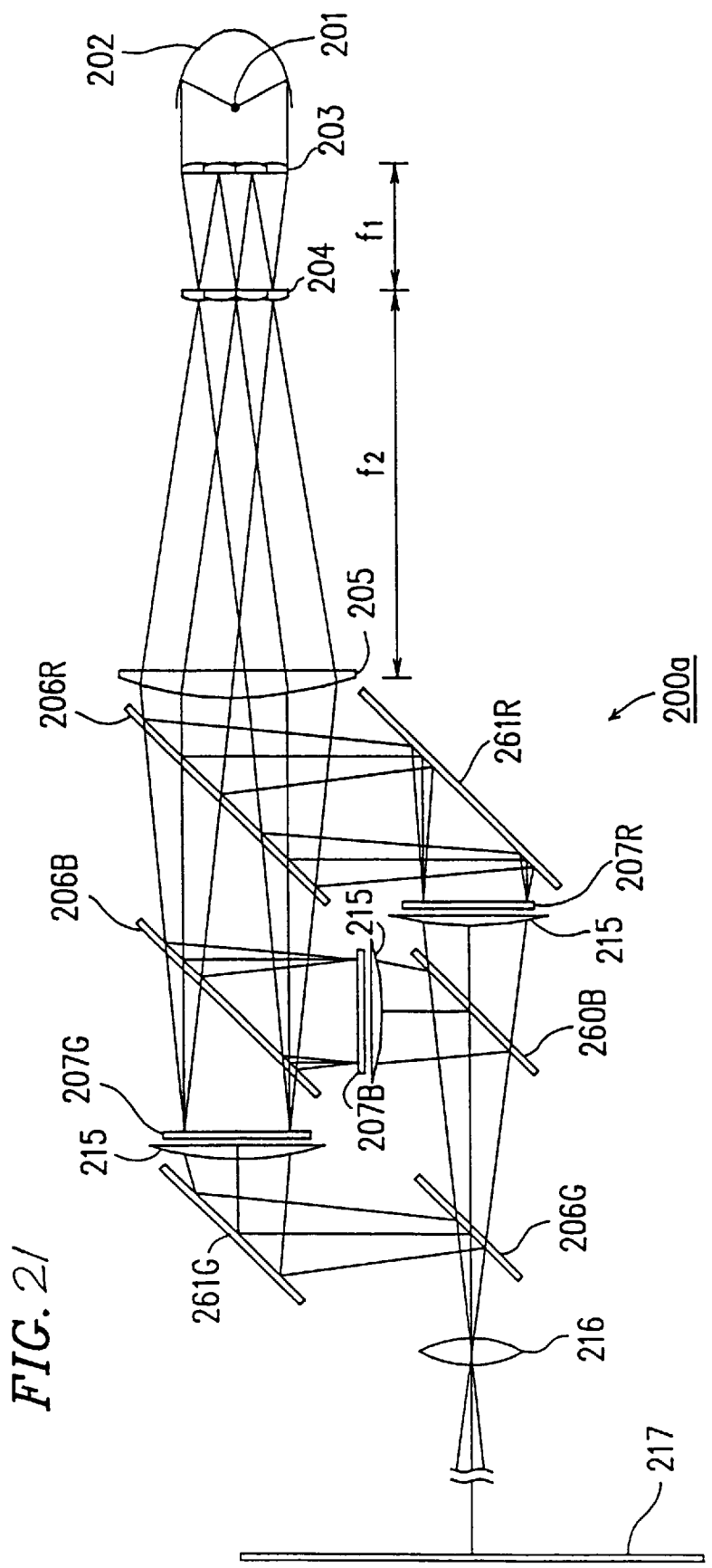
FIG. 21 is a schematic plan view of a liquid crystal color projector in a sixth example according to the present invention.

FIG. 21 is a schematic plan view of a liquid crystal color projector 200a in the sixth example.

As shown in FIG. 21, the liquid crystal color projector 200a includes three liquid crystal display devices 207R, 207G and 207B for modulating light in prescribed wavelength ranges, namely, red, green and blue light. The liquid crystal color projector 200a further includes a light component generation section. The light component generation section includes a light source 201 for white light, a paraboloidal mirror 202 for reflecting and collimating the light from the light source 201, fly's eye lenses 203 and 204 (groups of lenses) for dividing the collimated light into a plurality of light components, and a convex lens 205 for collimating the light components diverging from each convex lens of the fly's eye lenses 203 and 204.

The light source 201 is formed of a metal halide lamp having a power consumption of 250 W and an arc length of 3.0 mm. The paraboloidal mirror 202 is located so as to have a focal point at the position of the light source 201. The paraboloidal mirror 202 has a focal length of 22 mm and a square opening having a size of 120 mm×120 mm. The fly's eye lenses 203 and 204 each have a structure shown in FIG. 22 (only the fly's eye lens 203 is shown). Each fly's eye lens includes seven convex lenses 203a through 203g, all having a square contour as seen looking along a normal to the lenses. The lens 203a is located at the center and is surrounded by lenses 203b through 203g. The fly's eye lens is symmetric both vertically and horizontally.

With reference to FIG. 21 again, a dichroic mirror 206R for reflecting red light and a mirror 261R are provided between the convex lens 205 and the liquid crystal display device 207R. A plurality of red light components reflected by the dichroic mirror 206R are reflected by the mirror 261R and are incident on the liquid crystal display device 207R.

A dichroic mirror 206B for reflecting blue light is provided between the dichroic mirror 206R and the liquid crystal display device 207B. A plurality of blue light components which are reflected by the dichroic mirror 206B are incident on the liquid crystal display device 207B. Green light components which are transmitted through the dichroic mirror 206B are incident on the liquid crystal display device 207G.

Furthermore, an optical system is located in the paths of light components modulated by the liquid crystal display devices 207R, 207G and 207B. The optical system is provided for projecting light components modulated by the liquid crystal display devices 207R, 207G and 207B in a superimposed manner to display a multi-color image on a screen 217.

In detail, a field lens 215, a mirror 261G and a dichroic mirror 206G for reflecting green light are provided in the path of the light transmitted through the liquid crystal display device 207G. The green light component transmitted through the liquid crystal display device 207G is transmitted through the field lens 215, reflected by the mirror 261G and the dichroic mirror 206G, and then is incident on a projection lens 216 located opposed to the screen 217.

Another field lens 215 and a dichroic mirror 260B for reflecting blue light are provided in the path of the light transmitted through the liquid crystal display device 207B. The blue light transmitted through the liquid crystal display device 207B is transmitted through the field lens 215, reflected by the dichroic mirror 260B, transmitted through the dichroic mirror 206G, and then is incident on the projection lens 216.

Still another field lens 215 is provided in the path of the light transmitted through the liquid crystal display device 207R. The red light transmitted through the liquid crystal display device 207R is transmitted through the field lens 215 and the dichroic mirrors 260B and 260G, and then is incident on the projection lens 216.

The liquid crystal display devices 207R, 207G and 207B have a structure shown in FIG. 23A. As shown in FIG. 23A, each liquid crystal display device includes a liquid crystal panel 214, a microlens array 209 provided on the light incident surface of the liquid crystal panel 214, and polarizers 208 and 213 interposing the liquid crystal panel 214.

The liquid crystal panel 214 includes a pair of substrates 210 and 212, and a liquid crystal layer (not shown) held between by substrates 210 and 212. The structure of the liquid crystal panel 214 is the same as shown in FIG. 2 although the reference numerals are different. In FIG. 23A, reference numeral 211 denotes pixel apertures of the liquid crystal panel 214.

Figure 6:
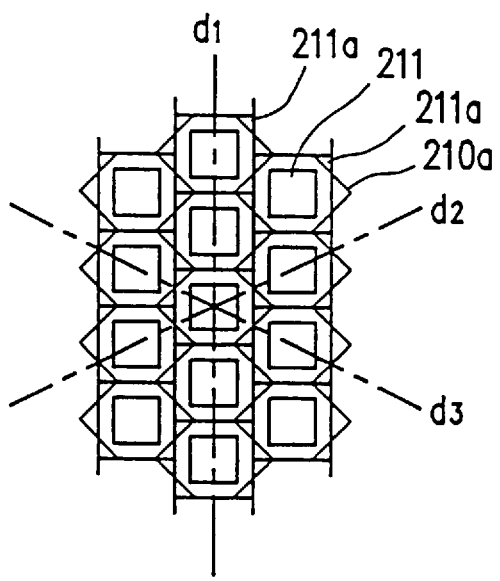
FIG. 6 shows the positional relationship of the pixels and the microlenses in a liquid crystal color projector in FIG. 5.

The microlens array 209 includes a plurality of spherical microlenses and is formed by an ion exchange method. FIG. 6 shows the positional relationship of the pixels 211a and the microlenses (represented by reference numeral 210a) as seen looking along a normal to the microlens array 209. As shown in FIG. 6, the microlenses 210a each have a hexagonal contour and are arranged in a honeycomb-like manner.

The pixels 211a are arranged in such a manner that the pixels 211a are positioned in a checkerboard-like manner and then the pixels 211a in odd-numbered or even-numbered vertical lines are offset from the pixels 211a in the other vertical lines by half of the length of the side of the pixel 211a in the vertical direction.

The liquid crystal color projector 200a operates in the following manner.

Figure 22:
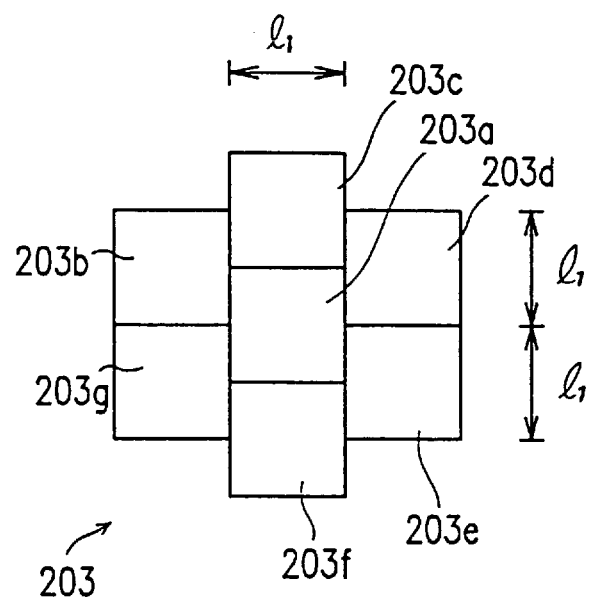
FIG. 22 is a plan view of a fly's eye lens used in the liquid crystal color projector shown in FIG. 21.
Figure 23:
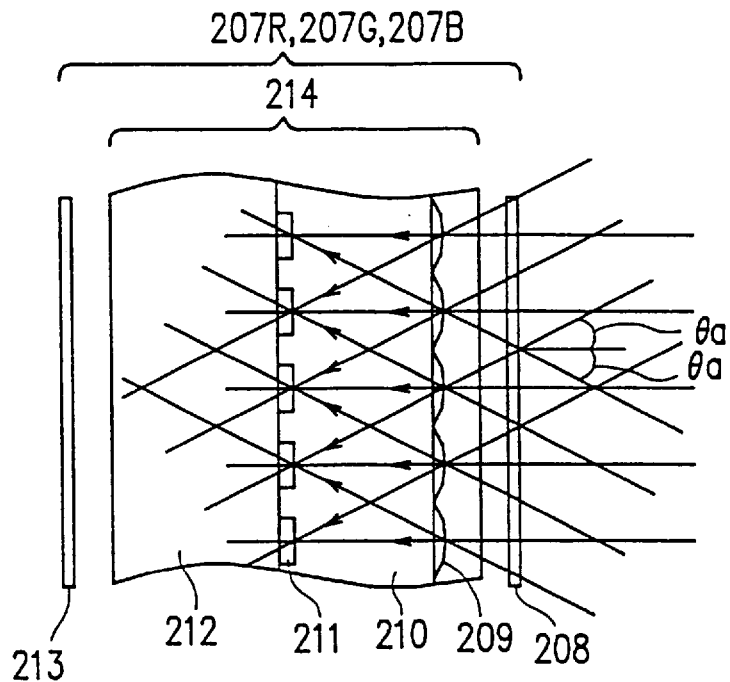
FIGS. 23A and 23B show a plurality of light components which are incident on a liquid crystal display device of the liquid crystal color projector shown in FIG. 21 in two different cross-sections.
Figure 23:
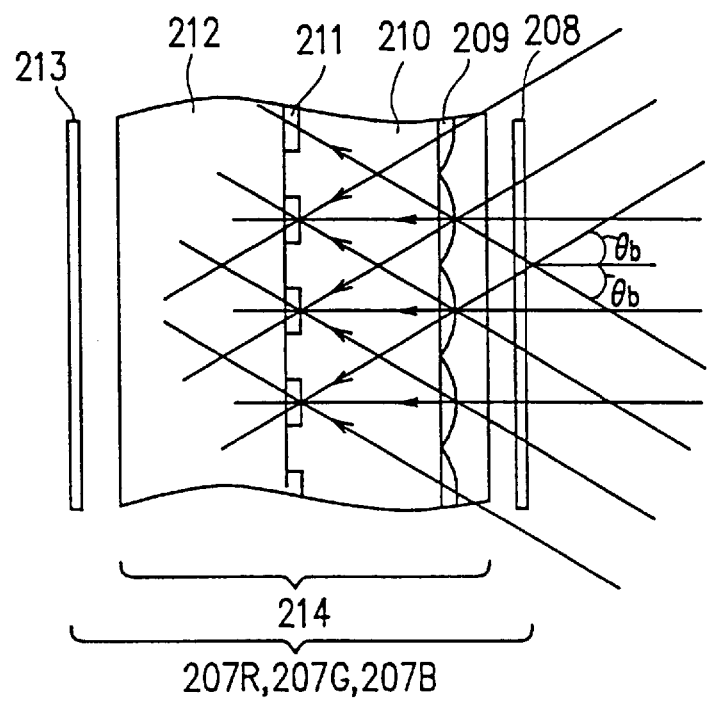
Figure 24:
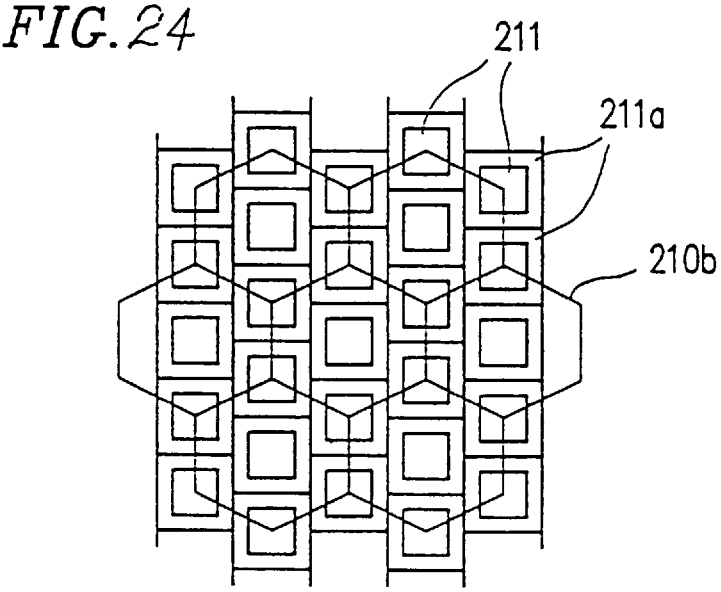
FIG. 24 shows another positional relationship of the pixel apertures and the microlenses usable in a liquid crystal color projector shown in FIG. 21.

Light emitted by the light source 201 is reflected by the paraboloidal mirror 202 to be collimated. The collimated light is incident on the fly's eye lens 203 and is divided into a plurality of light components, i.e., seven light components by the lenses 203a through 203g (FIG. 22).

The obtained light components are transmitted through the fly's eye lens 204. The lenses of the fly's eye lens 204 are each located at a focal point of the corresponding lens of the fly's eye lens 203. Then, the light components are incident on the convex lens 205 to be collimated. The light components are then divided into RGB light components by the dichroic mirrors 206R and 206B respectively for reflecting red and blue light components, and the RGB light components are incident on the liquid crystal display devices 207R, 207G and 207B.

The fly's eye lenses 203 and 204 are designed so that the principal rays of the light components are incident on the microlens array 209 of each liquid crystal display device at angles of 0° and $\pm\theta_a°$ (FIG. 23A) in a cross-section defined by chain line d1 (FIG. 6) and so that the principal rays of the light components are incident on the microlens array 209 at angles of 0° and $\pm\theta_b°$ (FIG. 23B) in a cross-section defined by chain line d2 or d3 (FIG. 6). Thus, the light components are incident on the microlens array 209 in seven directions, and seven light spots are formed in different pixel apertures 211. In FIGS. 23A and 23B, only the principal rays are shown for simplicity.

The light components transmitted through the polarizer 208, the microlens array 209, and the pixel apertures 211 of the respective liquid crystal display panel 214 are then transmitted through the respective polarizer 213, the respective field lens 215, and the projection lens 216 to be projected on the screen 217. Thus, a multi-color image is displayed on the screen 217.

In FIG. 6, the pixels and the microlenses correspond to each other one to one. The pixels and the microlenses can have the positional relationship shown in FIG. 24, in which each microlens is four times as large and corresponds to seven pixel apertures. Such large microlenses are advantageous for increasing the precision of the arrangement relatively easily. Smaller microlenses are more difficult to produce with sufficient precision and thus are more expensive to produce. With the structure shown in FIG. 24, sufficiently large microlenses can be produced even if the size of the liquid crystal panel is reduced or the pixel pitch is reduced in order to obtain a higher resolution.

Hereinafter, a method for setting the angles $\theta_a$ and $\theta_b$ will be described, using a 3-inch panel as an example.

In a 3-inch panel where the pixel pitch is 95 μm in both vertical and horizontal directions, the size of the pixel aperture 211 is 64 μm (vertical)×64 μm (horizontal), and the number of pixels is 450 (vertical)×600 (horizontal). Where the focal length of the microlens array 209, which is based on the thickness of the counter substrate 210 (0.7 mm; refractive index n=1.53), is 0.458 mm (0.7 mm/1.53), the light component entering each pixel aperture 211 needs to be substantially as parallel as $\pm\tan^{-1}(32/458)=\pm4.0°$ in the cross-section shown in FIG. 23A.

The principal rays of the light components entering the adjacent pixel aperture have incident angles of $\pm\tan^{-1}(95/458)=\pm11.7°$ with respect to the principal ray of the above-mentioned light component. The tolerable incident angle is in the range of $\pm\tan^{-1}((95+32)/458)$ to $\pm\tan^{-1}((95-32)/458)$ =±(15.5° to 7.8°).

In other words, the tolerable incident angle of the light component having a principal ray which is inclined by $\theta=\pm_a 11.7°$ with respect to the optical axis of the microlens in the horizontal plane is ±(3.8° to (−3.9°)).

In the cross-section shown in FIG. 23B, a light component enters the pixel aperture through one microlens, and different light components enter the adjacent pixel apertures through the same microlens. The light components entering the adjacent pixel apertures have incident angles of $\pm\tan^{-1}((95^2+47.5^2)^{1/2}/458)=\pm13.1°$ with respect to the principal ray of the light component entering the pixel aperture directly below the microlens.

Hereinafter, a method for setting the focal length of the fly's eye lenses 203 and 204, the focal length and the position of the convex lens 205 will be described.

Returning to FIG. 22, the length of one side of each square convex lens (203a through 203g) is $l_1$, the focal length of the lens (203a through 203g) is f1, the length of the longer side of the liquid crystal display device is $l_2$, and the focal length of the convex lens 205 is f2. As shown in FIG. 21, the length of the optical path from the fly's eye lens 203 to the fly's eye lens 204 is f1, the length of the optical path from the fly's eye lens 204 to the convex lens 205 is f2, and the length of the optical path from the convex lens 205 to each of the liquid crystal display devices 207R, 207G and 207B is f2.

The angle $\theta_a$ (FIG. 23A) and the above-mentioned lengths have the relationship represented by expressions (3) and (4).

$$l_1 = f2 \times \sin\theta_a \quad (3)$$

$$l_1/l_2 = f1/f2 \quad (4)$$

For example, in order to fulfill $\phi_1=120/3=40$ mm where the light component incident on the fly's eye lens 203 has a cross-section of 120 mm×120 mm, $l_2=61$ mm, and $\theta_a=11.7°$; from (3), $f2=l_1/\sin\theta_a=40/\sin 11.7°=197$ mm; and from (4), $f1=l_1\times f2/l_2=40\times 197/61=129$ mm.

Accordingly, for example, the light components transmitted through the central lenses 203a of the fly's eye lenses 203 and 204 are incident on the microlens array 209 of each of the liquid crystal display device 207R, 207G and 207B at an incident angle of 0°. The light components transmitted through the other six lenses 203b through 203g of the fly's eye lenses 203 and 204 enters the pixel apertures of the liquid crystal panel 214 from six different directions at incident angles $\theta_a$= 11.7° in the cross-section of FIG. 23A and at incident angles $\theta_b$=13.1° in the cross-section of FIG. 23B. The light components enter the respective pixel apertures 211 from these seven directions in the same amount. In this manner, each pixel aperture 211 receives light components from seven different directions; i.e., the amount of light entering each pixel aperture 211 is seven times greater. Theoretically, the resultant image is seven times brighter than the image obtained in the conventional liquid crystal color projector.

As shown in FIG. 22, the lenses 203a through 203g of the fly's eye lenses 203 and 204 have a similar rectangular shape relative to the liquid crystal display devices 207R, 207G and 207B. Accordingly, the light components incident on the liquid crystal panel 214 also have a rectangular cross-section. Such a rectangular cross-section increases the light utilization efficiency compared to a circular cross-section.

In the sixth example, the fly's eye lens includes seven lenses, and the light components are incident on the liquid crystal panel 214 from seven different directions. The fly's eye lens can have other structures.

Figure 25:
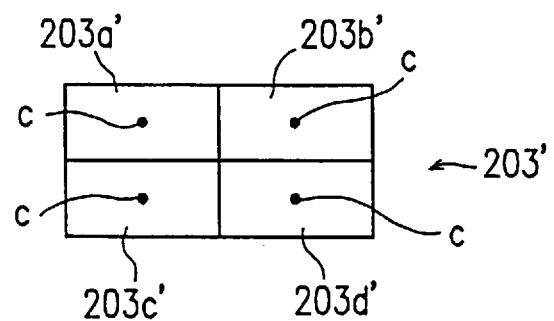
FIGS. 25 and 26 show exemplary structures of a fly's eye lens usable in the liquid crystal color projector shown in FIG. 21.

FIG. 25 shows another fly's eye lens 203'. The fly's eye lens 203' includes four lenses 203a' through 203d' having a rectangular shape as seen looking along a normal to the lenses. When the fly's eye lens 203' is used in lieu of the above-described fly's eye lenses 203 and 204, light components enter each pixel aperture from four different directions.

Figure 26:
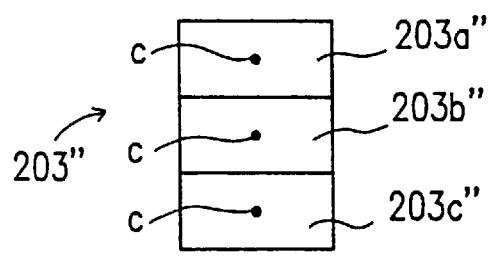

FIG. 26 shows still another fly's eye lens 203". The fly's eye lens 203" includes three lens 203a" through 203c" having a rectangular shape as seen looking along a normal to the lenses. When the fly's eye lens 203" is used in lieu of the above-described fly's eye lenses 203 and 204, light components enter each pixel aperture from three different directions.

In either case, the optical system can be designed in the same manner as described above, and the pixels in the liquid crystal display panels are arranged as shown in FIG. 6. In FIGS. 25 and 26, a letter c denotes the optical axis of each of convex lenses included in the fly's eye lens.

As can be appreciated from FIGS. 25 and 26, the optical axes of the plurality of lenses in one fly's eye lens need to be located in a pattern similar to the pattern in which the centers of the plurality of pixels are arranged in the liquid crystal display device. The fly's eye lens needs to be designed so that the principal rays from the lenses in the fly's eye lens cross one another on the light incident surface of the liquid crystal display device and enter the corresponding pixel apertures through the microlens array. For example, the centers of the lenses 203a' through 203d' in FIG. 25 are arranged in a pattern similar to the pattern in which the centers of the pixels 211a are arranged on the two outer vertical lines. The centers of the lenses 203a" through 203c" in FIG. 26 are arranged in a pattern similar to the pattern in which the centers of any three pixels 211a are arranged vertically.

FIG. 27 shows a usable structure for the fly's eye lens. The fly's eye lens can have any structure as long as three lenses in the central line are square and the other lenses in the right and left lines are rectangular as seen looking along a normal to the lenses. In summary, the fly's eye lens can have any structure in which the optical axes c of the lenses are arranged as shown in FIG. 27.

In the case where the pixels in the liquid crystal display device are arranged as shown in FIG. 28A, the fly's eye lens can have a structure shown in any of FIGS. 28B through 28F. In other words, the fly's eye lens can have any structure in which the optical axes c of the lenses are arranged in a pattern similar to the pattern in which the centers of a prescribed number of adjacent pixels are arranged. In FIG. 28A, for simplicity, the microlens array is not shown.

The fly's eye lens shown in FIG. 28B is used to cause light components to enter each pixel aperture of the liquid crystal panel from two different directions. The fly's eye lens shown in FIG. 28C is used to cause light components to enter each pixel aperture from three different directions. The fly's eye lenses shown in FIGS. 28D, 28E and 28F are respectively used to cause light components to enter each pixel aperture from nine, four, and five different directions.

In the sixth example, the fly's eye lenses 203 and 204 are used to cause light components to enter each pixel aperture of the liquid crystal panel from a plurality of different directions and superimpose the light spots formed by the light components in each pixel aperture. Other systems can be also used in lieu of fly's eye lenses.

(EXAMPLE 7)

A liquid crystal color projector including three liquid crystal panels in a seventh example according to the present invention will be described with reference to FIGS. 29 through 31. Identical elements previously discussed with respect to FIG. 21 will bear identical reference numerals therewith and the descriptions thereof will be omitted.

Figure 29:
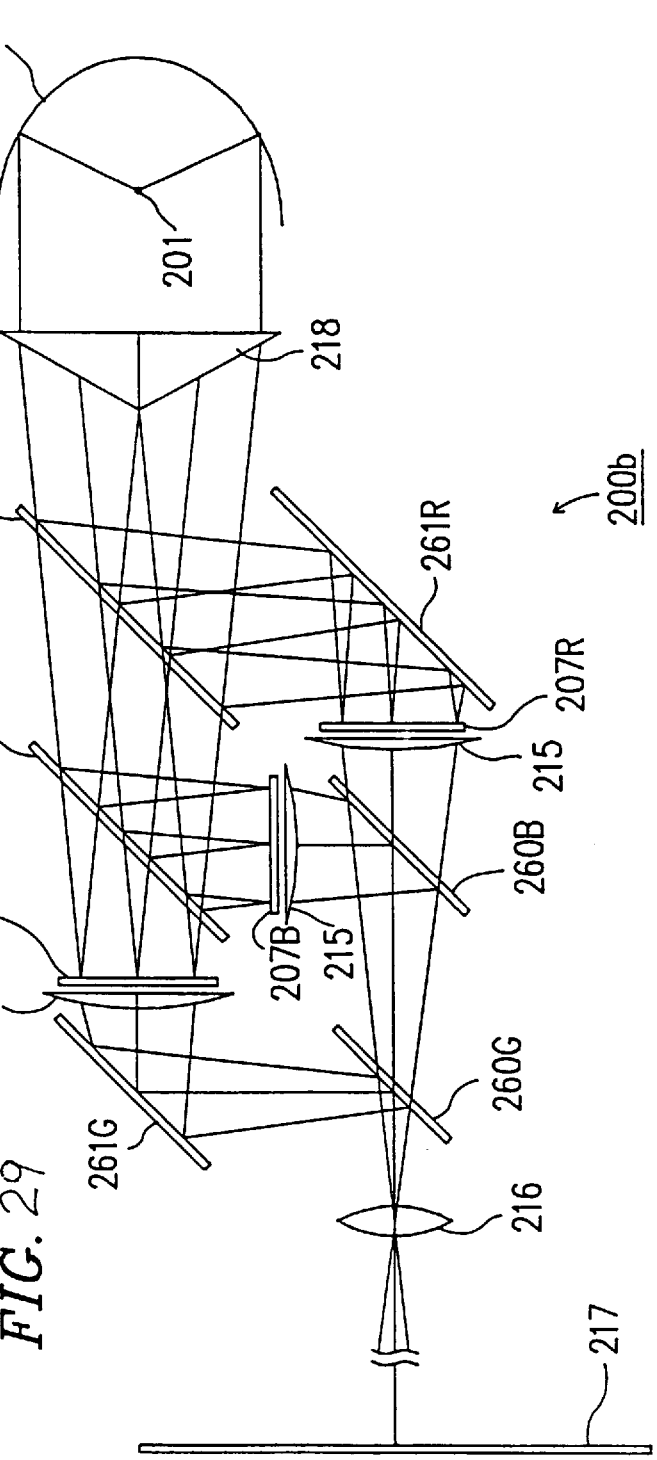
FIG. 29 is a schematic plan view of a liquid crystal color projector in a seventh example according to the present invention.

FIG. 29 is a schematic plan view of a liquid crystal color projector 200b in the seventh example.

Figures 30A, 30B:
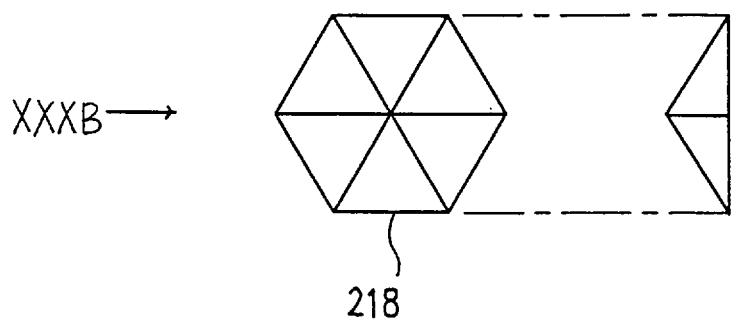
FIG. 30A is a front view of a wedge prism used in the liquid crystal color projector show in FIG. 29.
FIG. 30B is a side view of the wedge prism as seen in the direction of arrow XXXB in FIG. 30A.

In the liquid crystal color projector 200b, a hexagonal pyramid wedge prism 218 for dividing light from the paraboloidal mirror 202 is provided in lieu of the fly's eye lenses 203 and 204 and the convex lens 205 used in the sixth example. FIG. 30A shows a front view of the wedge prism 218 as seen in the direction of the optical axis thereof, and FIG. 30B is a side view thereof as seen in the direction of arrow XXXB in FIG. 30A. The liquid crystal color projector 200b has the same structure as the liquid crystal color projector 200a in the sixth example in the other points.

The liquid crystal color projector 200b operates in the following manner.

White light from a light source 201 is reflected by a paraboloidal mirror 202 located to have a focal point at the position of the light source 201 to be collimated. The collimated light is transmitted through the wedge prism 218 and then divided into RGB light components. The RGB light components are incident on the liquid crystal display devices 207R, 207G and 207B, respectively.

The wedge prism 218 forming an optical system is designed so that the principal rays of a total of six light components are incident on the microlens array 209 in each of the liquid crystal display devices 207R, 207G and 207B as shown in FIGS. 23A and 23B. In detail, in the cross-section defined by chain line d1 (FIG. 6), the principal rays are incident on the microlens array 209 at incident angles of $\pm\theta_a$° (FIG. 23A). In the cross-sections defined by chain line d2 or d3 (FIG. 6), the principal rays are incident on the microlens array 209 at incident angles of $\pm\theta_b$° (FIG. 23B). In this example, no light component is incident on the microlens array 209 at an incident angle of 0° in either cross-section. Thus, six light spots are formed in the respective pixel apertures 211. Thus, the light components enter the respective pixel apertures 211 from six different directions in the same amount. In this manner, each pixel aperture 211 receives light components in six different directions; i.e., the amount of light entering each pixel aperture 211 is six times greater. Theoretically, the resultant image is six times brighter than the image obtained in the conventional liquid crystal color projector.

The light components transmitted through the liquid crystal display devices 207R, 207G and 207B are then transmitted through the respective polarizer 213 (FIGS. 23A and 23B), the respective field lens 215 (FIG. 29), and the projection lens 216 to be projected on the screen 217. Thus, a multi-color image is displayed on the screen 217.

In the seventh example, the wedge prism 218 is used for causing light components to enter the pixel aperture 211 in six different directions through the microlens array 209. Other systems also can be used in lieu of the wedge prism 218.

Figures 31A, 31B:
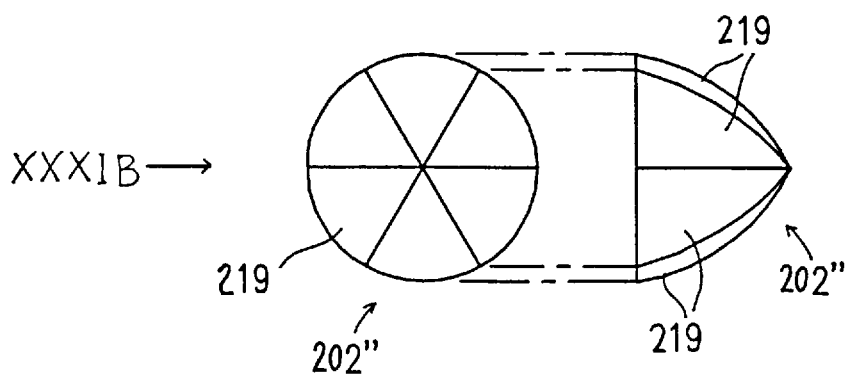
FIG. 31A is a side view of a paraboloidal mirror usable in the liquid crystal color projector shown in FIG. 29.
FIG. 31B is a side view of the paraboloidal mirror as seen in the direction of arrow XXXIB in FIG. 30A.

For example, a paraboloidal mirror 202" shown in FIGS. 31A and 31B can be used. FIG. 31A is a front view of the paraboloidal mirror 202" as seen in the direction of the optical axis thereof, and FIG. 31B is a side view thereof as seen in the direction of arrow XXXIB. The paraboloidal mirror 202" can include six surfaces 219 defined by planes including symmetrical axes of the paraboloidal mirror 202". The six surfaces are inclined towards the optical axis of the paraboloidal mirror more than in a general paraboloidal mirror, namely, a paraboloidal mirror having a shape for reflecting and collimating the light. Thus, principal rays of light components reflected by the six surfaces 219 are superimposed on one another on the light incident surface of each liquid crystal display device and enter the respective pixel apertures through the microlens array.

When the paraboloidal mirror 202" is used in the liquid crystal color projector 200b (FIG. 29), light components are incident on each liquid crystal display device at $\pm\theta_a°$ in the cross-section represented by chain line d1 (FIG. 6) and at $\pm\theta_b°$ in the cross-section defined by chain line d2 or d3 (FIG. 6).

By using the paraboloidal mirror 202", light components can be incident on the liquid crystal display device from six different directions without using additional optical elements. Thus, the production cost of the liquid crystal color projector can be further is reduced.

(EXAMPLE 8)

A liquid crystal color projector including three liquid crystal panels in an eighth example according to the present invention will be described with reference to FIGS. 32 through 35.

Figure 32:
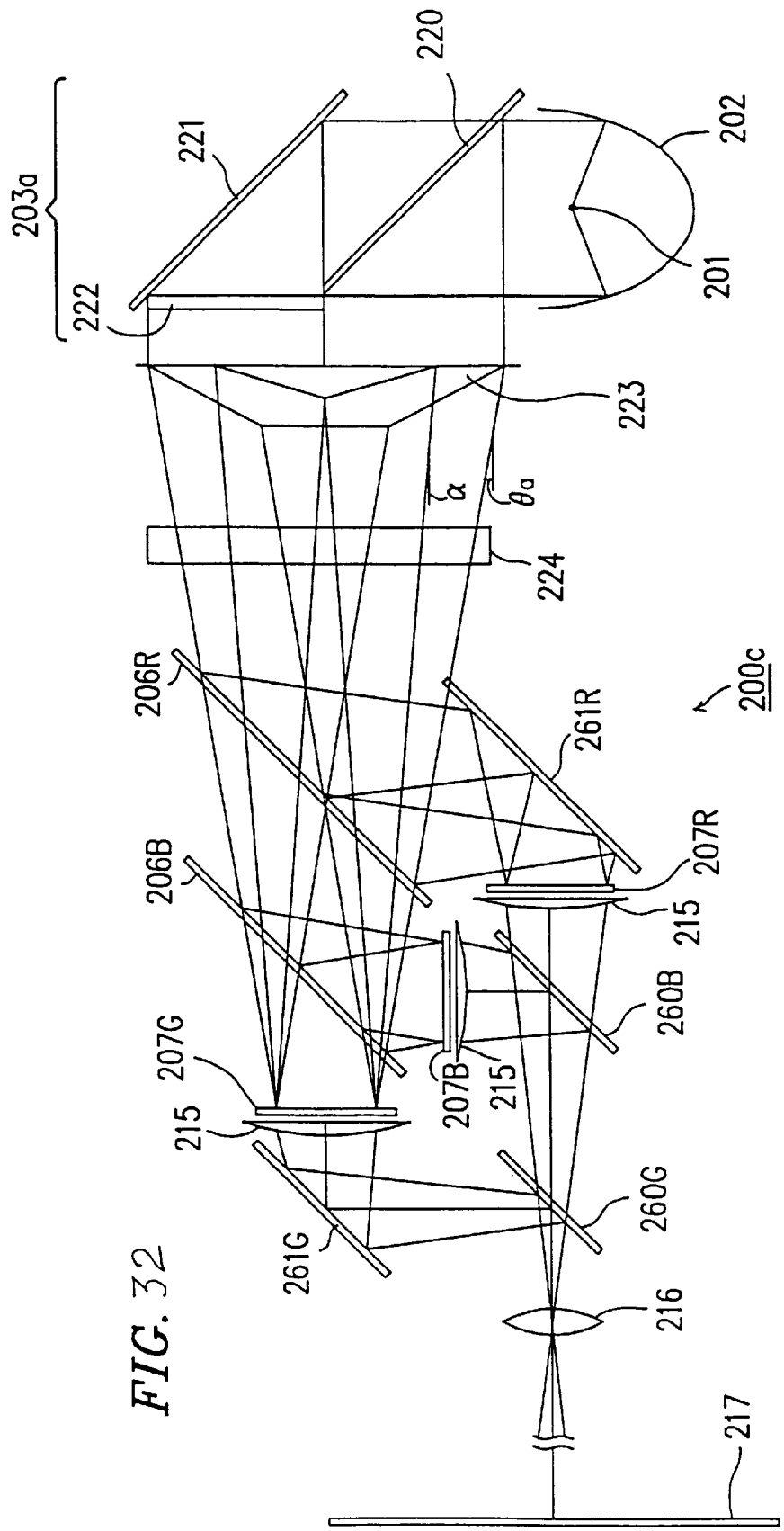
FIG. 32 is a schematic plan view of a liquid crystal color projector in an eighth example according to the present invention.

FIG. 32 is a schematic plan view of a liquid crystal color projector 200c in the eighth example. Identical elements previously discussed with respect to FIG. 21 will bear identical reference numerals therewith and the descriptions thereof will be omitted.

The liquid crystal color projector 200c includes a light dividing and combining device 203a in lieu of the fly's eye lenses 203 and 204 and the convex lens 205. The light dividing and combining device 203a is provided for dividing parallel light from the paraboloidal mirror 202 into a P-polarized light component and an S-polarized light component (first S-polarized light component), converting the P-polarized light component into an S-polarized light component (second S-polarized light component), and combining the first and second S-polarized light components. In the eighth example, the paraboloidal mirror 202 has a focal length of 22 mm and a square opening having a size of 90 mm×90 mm.

Figure 33A:
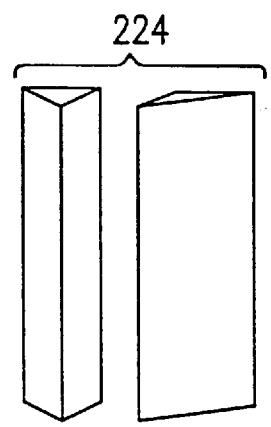
FIG. 33A is a perspective view of a wedge prism used in the liquid crystal color projector shown in FIG. 32.
Figure 33B:
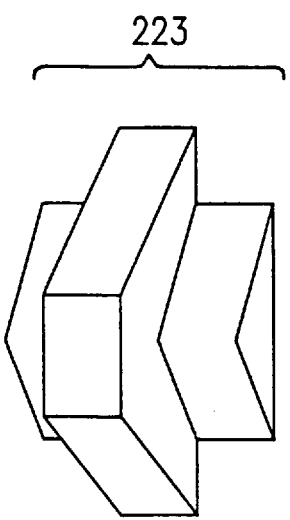
FIG. 33B is a perspective view of another wedge prism used in the liquid crystal color projector shown in FIG. 32.

The light dividing and combining device 203a includes a polarization beam splitter 220 for allowing a P-polarized light component of the light reflected and collimated by the paraboloidal mirror 202 to be transmitted therethrough and reflecting a first S-polarized light component. The light dividing and combining device 203a further includes a mirror 221 for reflecting the P-polarized light component, and a half-wave plate 222 for converting the P-polarized light component into a second S-polarized light component. The first S-polarized light component from the polarization beam splitter 220 and the second S-polarized light component from the half-wave plate 222 are incident on an optical system for generating seven light components from the first and second S-polarized light components. The optical system includes a first wedge prism 223 and a second wedge prism 224. FIG. 33A is a perspective view of the second wedge prism 224, and FIG. 33B is a perspective view of the first wedge prism 223.

The liquid crystal color projector 200c operates in the following manner.

White light emitted by the light source 201 is reflected and collimated by the paraboloidal mirror 202 located to have a focal point at the position of the light source 201. The P-polarized light component of the collimated light is transmitted through the polarization beam splitter 220, and the first S-polarized light component of the collimated light is reflected by the polarization beam splitter 220. The P-polarized light component is reflected by the mirror 221 and then converted into the second S-polarized light component by the half-wave plate 222. In this manner, the light reflected and collimated by the paraboloidal mirror 202 entirely becomes S-polarized light, and is incident on the first wedge prism 223 and then the second wedge prism 224.

The first and the second S-polarized light components are divided into seven light components, which are then divided into red, green and blue light components by the dichroic mirrors 206R, 206G and 206B. The RGB light components are respectively incident on the microlens array of each of the liquid crystal display is devices 207R, 207G and 270B.

The optical system including the first and second wedge prisms 223 and 224 is designed so that principal rays of the seven light components are incident on the microlens array 209 at angles of 0° and $\pm\theta_a°$ as shown in FIG. 23A in the cross-section represented by chain line d1 (FIG. 6) and at angles of 0° and $\pm\theta_b°$ as shown in FIG. 23B in the cross-section defined by chain line d2 or d3 (FIG. 6). Thus, the light components are incident on the liquid crystal display device from seven different directions to form seven light spots in different pixel apertures corresponding to the microlenses through which the light components are incident.

In detail, the optical system is designed to function in the following manner.

Each of the light components from the light dividing and combining device 203a is vertically divided into three areas, namely, a central area and two side areas. The two side areas are each divided into top and bottom areas (referred to as "side top and side bottom areas"), and the central area is divided into top, center and bottom areas (referred to as "central top, central and central bottom areas").

The principal rays of these seven areas of each light component go out from the first prism 223 in the following state in the vertical plane defined in the third example. The principal rays of the side top and side bottom areas are inclined by the first wedge prism 223 at $\alpha=\tan^{-1}(47.5/458) =\pm5.9°$ with respect to the optical axis of the light component in the vertical plane. The principal rays of the central top and central bottom areas are inclined at $\theta°_a = \tan^{-1}(95/458) = \pm 11.7°$ with respect to the optical axis of the light component in the vertical plane. The principal rays of the central area are not inclined with respect to the optical axis of the light component.

In the horizontal plane defined in the third example, the principal rays of the side top and side bottom areas are inclined at $\theta_a = \tan^{-1}(95/458) = \pm 11.7°$ by the second wedge prism 224. The seven light components cross one another on the microlens array and enter the corresponding pixel apertures.

By designing the first and second prisms 223 and 224 so that the cross-section of each of the seven light components have a shape similar to the shape of the pixel apertures, the light components can entirely enter the pixel apertures, thus improving the light utilization efficiency.

The seven light components enter the respective pixel apertures from seven different directions in the same amount. In this manner, each pixel aperture receives light components from seven different directions; i.e., the amount of light entering each pixel aperture is seven times greater. Theoretically, the resultant image is seven times brighter than the image obtained by light components entering from one direction.

Furthermore, the P-polarized light component which is wasted in a conventional projector is converted into the second S-polarized light component by the light dividing and combining device 203a, and the first and second light components enter the same pixel aperture in the same amount. Accordingly, the resultant image is twice as bright as the image obtained by a projector in which the P-polarized light component is shielded.

The P-polarized light component is prevented from being shielded or absorbed by the polarizer and converted into heat. Accordingly, a conventional problem that the polarizer is melted or burned by the heat is solved. Due to the use of the wedge prisms, the light components having a cross-section enlarged by the light dividing and combining device 203a can be substantially fully utilized.

Figure 34A:
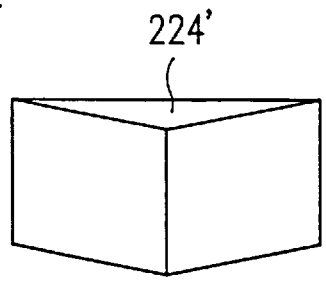
FIG. 34A is a perspective view of a wedge prism usable in the liquid crystal color projector shown in FIG. 32.
Figure 34B:
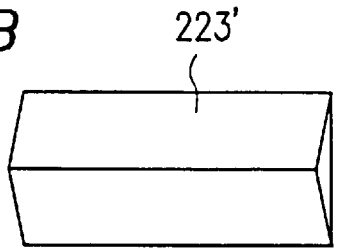
FIG. 34B is a perspective view of another wedge prism usable in the liquid crystal color projector shown in FIG. 32.

FIGS. 34A and 34B respectively show wedge prisms 224' and 223' usable in the liquid crystal color projector 200c in lieu of the wedge prisms 223 and 224. When the wedge prisms 224' and 223' are used, light components enter the pixel apertures from four different directions.

Figure 35:
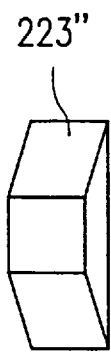
FIG. 35 is a perspective view of a wedge prism usable in the liquid crystal color projector shown in FIG. 32.

FIG. 35 shows a wedge prism 223" also usable in the liquid crystal color projector 200c in lieu of the wedge prisms 223 and 224. When the wedge prism 223" is used, light components enter the pixel apertures from three different directions.

In the case where the wedge prisms 223 and 224 or the wedge prism 223" is used, the optical system can be designed in the same manner as described above; i.e., the principal rays of the light components refracted by surfaces of the prisms cross each other on the light incident surface of the liquid crystal display device and enter the respective pixel aperture. The liquid crystal display device should have the structure shown in FIG. 6.

By combining the wedge prisms shown in FIGS. 34A and 34B or the wedge prism shown in FIG. 35 with the light dividing and combining device 203a, the P-polarized light component which is wasted in a conventional projector can enter the pixel apertures. Thus, the resultant image is twice as bright as the image obtained by a projector in which the P-polarized light component is shielded.

The P-polarized light component is prevented from being shielded or absorbed by the polarizer and converted into heat. Accordingly, a conventional problem that the polarizer is melted or burned by the heat is solved. Due to the use of the wedge prism or prisms, the light components having a cross-section enlarged by the light dividing and combining device can be substantially fully utilized. The wedge prism or prisms can be used in a projector in which parallel light from a lamp is incident on the liquid crystal display device, as well as in combination with the light dividing and combining device.

In the eighth example, a P-polarized light component is converted into an S-polarized light component, but the liquid crystal projector can have a structure in which the S-polarized light component is converted into a P-polarized light component, As described above, in a liquid crystal color projector according to the present invention, white light emitted by a light source is divided into two light components by, for example, a light shape dividing device or by providing two sets of illuminating systems each including a light source and a spherical mirror or the like, and then divided into red, green and blue light components by dichroic mirrors or the like. Two light components in the same wavelength range can be incident on one liquid crystal display device from different directions. Due to such a system, the light utilization efficiency can be improved to display a brighter image on the screen.

A microlens array provided on a light incident surface of the liquid crystal panel causes light components emitted by the light source to form light spots in pixel apertures in accordance with the incident angle.

Accordingly, even if the ratio of the nontransparent parts of the pixel which do not contribute to the display increases, the aperture ratio can be raised. Thus, it is possible to display a clearer image having a higher resolution by reducing the area of each pixel. Since light can efficiently enter the pixel apertures even in a liquid crystal panel which is small with respect to the cross-sectional area of the light, the liquid crystal color projector can be reduced in size.

In another liquid crystal color projector according to the present invention, a liquid crystal panel is provided for modulating a plurality of light components having three different wavelength ranges. The plurality of light components are incident on the liquid crystal panel at different incident angles defined in a first plane in correspondence with the wavelength ranges. On a second plane which is different from the first plane, two light components in the three wavelength ranges are incident on the liquid crystal display device. Accordingly, each pixel aperture of the liquid crystal panel receives two light components of the corresponding color from two different directions.

By such a structure, the amount of light of each of the RGB colors entering each pixel aperture can be increased without increasing the brightness of the light source or causing the light to be more parallel by reducing the size of the light source or enlarging the diameter of the pixel apertures of the liquid crystal panel.

For example, a light component having such a polarization direction that is absorbed in a conventional projector by the polarizer provided on the light incident side of the liquid crystal panel can be directed to the pixel apertures of the liquid crystal panel. The light passes through the polarizer and enters the pixel apertures at a prescribed angle with respect to a light component having a polarization direction that is transmitted through the polarizer. Thus, light which is wasted in a conventional projector can be fully utilized. As a result, the brightness of the image displayed on the screen is significantly enhanced.

A microlens array which is provided on a light incident surface of the liquid crystal panel and the pixel apertures are positioned in relation to each other so that the two light components having the same wavelength form light spots in the pixel aperture of the corresponding color. Thus, the two light components can enter each pixel aperture. In this manner, the light emitted by the light source can be utilized with substantially no waste, thus increasing the amount of light which is transmitted through the liquid crystal display device. Accordingly, the brightness displayed on the screen can be significantly enhanced.

In another liquid crystal color projector according to the present invention, a light component generation section is provided for generating a plurality of light components in three different wavelength ranges required for multi-color display (corresponding to the RGB colors) in such a manner that the light components are incident on the liquid crystal device provided for each of the RGB colors at different incident angles. A plurality of light components are incident on the respective liquid crystal display devices. In this system, when the cross-section of light incident on the pixel aperture is enlarged in order to obtain a brighter image, such light can be utilized at a higher utilization efficiency with little light going outside the liquid crystal panel. Thus, the brightness of the image displayed on the screen can be enhanced.

A microlens array provided on the light incident surface of the liquid crystal panel is arranged so that each microlens corresponds to a plurality of adjacent pixel apertures and so that a plurality of light components in the same wavelength range which are incident on the microlens at different incident angles enter different pixel apertures. Accordingly, a brighter image can be displayed at a high efficiency, and a microlens array having high precision can be produced relatively easily at lower cost.

Furthermore, a fly's eye lens including a plurality of convex lenses is used as the light component generation section, and the fly's eye lens is designed so that the optical axes of the convex lenses are arranged in a pattern similar to the pattern in which centers of a prescribed number of adjacent pixel apertures are arranged. By such arrangement, light components can be incident on the liquid crystal display device from different directions relatively easily, and the brightness of the image displayed on the screen is improved due to more efficient use of light.

Moreover, such a structure realizes an optical system for causing light components to be incident on the liquid crystal display device from a plurality of directions relatively easily without using additional optical elements. Accordingly, a liquid crystal color projector for displaying a brighter image on the screen at lower cost can be realized.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal projector, comprising:
   a light source for generating light;
   a liquid crystal display device for modulating the light, the liquid crystal display device including a liquid crystal panel having a plurality of pixel apertures and a microlens array which is provided in a path of light to be incident on the liquid crystal panel and which has a plurality of microlenses, the plurality of microlenses causing two light components to enter the plurality of pixel apertures, the microlens array is positioned so that the plurality of microlenses each correspond to a respective pair of pixel apertures, and the two light components incident on each of the microlenses enter the pair of pixel apertures, respectively;
   a projection optical system for projecting light modulated by the liquid crystal display device onto a screen; and
   an incidence optical system for dividing the light into at least the two light components in an equal wavelength range and causing the two light components to be incident on the liquid crystal display device from different directions,
   wherein the two light components incident on the liquid crystal display device enter the plurality of pixel apertures.

2. A liquid crystal projector according to claim 1, wherein the plurality of pixel apertures are positioned so that two adjacent pixel apertures are opposed to each of the plurality of microlenses.

3. A liquid crystal projector according to claim 1, wherein the incidence optical system includes:
   first optical means for dividing the light into a first light component for projection and a second light component for projection and causing the first and the second light components to be incident on a light incident surface of the liquid crystal display device symmetrically with respect to a normal to the light incident surface in a first plane perpendicular to the light incident surface; and
   second optical means for dividing each of the first light component for projection and the second light component for projection into three color light components in different wavelength ranges from one another, causing one of the three color light components to be incident along a normal to the light incident surface, and causing the other two color light components to be incident on the light incident surface symmetrically with respect to the one color light component in a second plane perpendicular to the light incident surface and the first plane.

4. A liquid crystal projector according to claim 3, wherein the first optical means includes:
   a polarization beam splitter for allowing a first polarized light component to be transmitted therethrough, and reflecting a second polarized light component having a different polarization direction from that of the first polarized light component to cause the first polarized light component to become the first light component for projection;
   a phase plate for aligning the polarization direction of the second polarized light component to the polarization direction of the first polarized light component to cause the second polarized light component to become the second light component for projection; and
   a mirror for reflecting the second polarized light component in a prescribed direction so that the first light component for projection and the second light component for projection become symmetric with respect to the normal to the light incident surface of the liquid crystal display device.

5. A liquid crystal projector according to claim 4, wherein the second optical means are dichroic mirrors for selectively reflecting the three color light components.

6. A liquid crystal projector according to claim 3, wherein:
   the plurality of pixel apertures of the liquid crystal panel are divided into three groups corresponding to the three color light components, and the liquid crystal display device includes a microlens array including a plurality of microlenses, and each of the microlenses causes the three color light components of the first and second light components for projection to enter the pixel apertures of the corresponding three groups.

7. A liquid crystal projector according to claim 1, wherein:

a total of three liquid crystal display devices are provided respectively for three different wavelength ranges, and the incidence optical system further includes an optical member for dividing each of the at least two light components for projection into three color light components respectively in the three wavelength ranges and causes the light components in each wavelength range to be incident on the corresponding liquid crystal display device from different directions.

8. A liquid crystal projector according to claim 7, wherein:

the three liquid crystal display devices each include a microlens array including a plurality of microlenses, and the plurality of microlenses correspond to the plurality of pixel apertures one to one, and the microlenses each collect and cause the two light components in the same wavelength range to enter the corresponding pixel aperture.

9. A liquid crystal projector comprising:

a light source for generating light;

a liquid crystal display device for modulating the light, the liquid crystal display device including a liquid crystal panel having a plurality of pixel apertures and a microlens array which is provided in a path of light to be incident on the liquid crystal panel and which has a plurality of microlenses, the plurality of microlenses causing two light components to enter the plurality of pixel apertures, wherein the microlens array is located so that the pixel apertures each correspond to a respective pair of microlenses adjacent to each other, and the two light components incident on the pair of microlenses both enter the corresponding one pixel aperture;

a projection optical system for projecting light modulated by the liquid crystal display device onto a screen; and an incidence optical system for dividing the light into at least the two light components in an equal wavelength range and causing the two light components to be incident on the liquid crystal display device from different directions.

10. A liquid crystal projector according to claim 9, wherein the liquid crystal panel is located so that borders between the adjacent pixel apertures are offset from borders between the microlenses.

11. A liquid crystal projector according to claim 10, wherein the borders between the adjacent microlenses are opposed to centers of the plurality of pixel apertures, respectively.

12. A liquid crystal projector according to claim 9, wherein the incidence optical system includes:

first optical means for dividing the light into a first light component for projection and a second light component for projection and causing the first and the second light components to be incident on a light incident surface of the liquid crystal display device symmetrically with respect to a normal to the light incident surface in a first plane perpendicular to the light incident surface; and second optical means for dividing each of the first light component for projection and the second light component for projection into three color light components in different wavelength ranges from one another, causing one of the three color light components to be incident along a normal to the light incident surface, and causing the other two color light components to be incident on the light incident surface symmetrically with respect to the one color light component in a second plane perpendicular to the light incident surface and the first plane.

13. A liquid crystal projector according to claim 12, wherein the first optical means includes:

a polarization beam splitter for allowing a first polarized light component to be transmitted therethrough, and reflecting a second polarized light component having a different polarization direction from that of the first polarized light component to cause the first polarized light component to become the first light component for projection;

a phase plate for aligning the polarization direction of the second polarized light component to the polarization direction of the first polarized light component to cause the second polarized light component to become the second light component for projection; and a mirror for reflecting the second polarized light component in a prescribed direction so that the first light component for projection and the second light component for projection become symmetric with respect to the normal to the light incident surface of the liquid crystal display device.

14. A liquid crystal projector according to claim 13, wherein the second optical means are dichroic mirrors for selectively reflecting the three color light components.

15. A liquid crystal projector according to claim 13, wherein:

the plurality of pixel apertures of the liquid crystal panel are divided into three groups corresponding to the three color light components, and the liquid crystal display device includes a microlens array including a plurality of microlenses, and each of the microlenses causes the three color light components of the first and second light components for projection to enter the pixel apertures of the corresponding three groups.

16. A liquid crystal projector according to claim 9, wherein:

a total of three liquid crystal display devices are provided respectively for three different wavelength ranges, and the incidence optical system further includes an optical member for dividing each of the at least two light components for projection into three color light components respectively in the three wavelength ranges and causes the light components in each wavelength range to be incident on the corresponding liquid crystal display device from different directions.

17. A liquid crystal projector according to claim 16, wherein:

the three liquid crystal display devices each include a microlens array including a plurality of microlenses, and the plurality of microlenses correspond to the plurality of pixel apertures one to one, and the microlenses each collect and cause the two light components in the same wavelength range to enter the corresponding pixel aperture.

18. A liquid crystal projector comprising:

a light source for generating light;

three liquid crystal display devices each for modulating the light, the three liquid crystal display devices each including a liquid crystal panel having a plurality of pixel apertures;

a projection optical system for projecting light modulated by each of the three liquid crystal display devices onto a screen;

an incidence optical system for dividing the light into at least two light components in an equal wavelength range and causing the two light components to be incident on each of the three liquid display devices from different directions;

wherein the two light components incident on each of the three liquid crystal display devices enter the plurality of pixel apertures; and the three liquid crystal display devices are provided respectively for the three different wavelength ranges, and the incidence optical system further includes an optical member for dividing each of the at least two light components for projection into three color light components respectively in the three wavelength ranges and causes the light components in each wavelength range to be incident on the corresponding one of the three liquid crystal display devices from different directions;

wherein the three liquid crystal display devices each include a microlens array including a plurality of microlenses, and each of the microlenses corresponds to at least two pixel apertures, and collects and causes the two light components in the same wavelength range to enter the at least two pixel apertures corresponding thereto.

19. A liquid crystal projector comprising:

a light source for generating light;

three liquid crystal display devices each for modulating the light, the three liquid crystal display devices including a liquid crystal panel having a plurality of pixel apertures;

a projection optical system for projecting light modulated by the three liquid crystal devices onto a screen;

an incidence optical system for dividing the light into at least two light components in an equal wavelength range and causing the two light components to be incident on the three liquid crystal display devices from different directions;

wherein the two light components incident on the three liquid crystal display devices enter the plurality of pixel apertures; and the three liquid crystal display devices are provided respectively for the three different wavelength ranges, and the incidence optical system further includes an optical member for dividing each of the at least two light components for projection into three color light components respectively in the three wavelength ranges and causes the light components in each wavelength range to be incident on the corresponding one of the three liquid crystal display devices from different directions;

wherein the incidence optical system includes a fly's eye lens having a plurality of convex lenses, and in each of the three liquid crystal display devices, the fly's eye lens is located so that the optical axes of the plurality of convex lenses are arranged in a pattern similar to a pattern in which centers of the plurality of pixel apertures are arranged.

20. A liquid crystal projector comprising:

a light source for generating light;

three liquid crystal display devices each for modulating the light, the three liquid crystal display devices each including a liquid crystal panel having a plurality of pixel apertures;

a projection optical system for projecting light modulated by each of the three liquid crystal display devices onto a screen;

an incidence optical system for dividing the light into at least two light components in an equal wavelength range and causing the two light components to be incident on each of the three liquid crystal display devices from different directions;

wherein the two light components incident on each of the three liquid crystal display devices enter the plurality of pixel apertures; and the three liquid crystal display devices are provided respectively for the three different wavelength ranges, and the incidence optical system further includes an optical member for dividing each of the at least two light components for projection into three color light components respectively in the three wavelength ranges and causes the light components in each wavelength range to be incident on the corresponding one of the three liquid crystal display devices from different directions;

wherein the optical member of the incidence optical system includes a paraboloidal mirror for reflecting and collecting the light from the light source, the paraboloidal mirror includes a plurality of surfaces which are inclined towards the optical axis of the paraboloidal mirror more than a paraboloidal mirror having a shape which is used for reflecting and collimating the light from the light source, the surfaces being inclined towards the optical axis so as to cause principal rays of the light components reflected by the surfaces to be superimposed on each of the three liquid crystal display devices.

21. A liquid crystal projector comprising:

a light source for generating light;

three liquid crystal display devices each for modulating the light, the three liquid crystal display devices each including a liquid crystal panel having a plurality of pixel apertures;

a projection optical system for projecting light modulated by each of the three liquid crystal display devices onto a screen;

an incidence optical system for dividing the light into at least two light components in an equal wavelength range and causing the two light components to be incident on each of the three liquid crystal display devices from different directions;

wherein the two light components incident on each of the three liquid crystal display devices enter the plurality of pixel apertures; and the three liquid crystal display devices are provided respectively for three different wavelength ranges, and the incidence optical system further includes an optical member for dividing each of the at least two light components for projection into three color light components respectively in the three wavelength ranges and causes the light components in each wavelength range to be incident on the corresponding one of the three liquid crystal display devices from different directions;

wherein the incidence optical system includes a plurality of prisms, which are arranged so that light components transmitted through and refracted by the prisms are superimposed on each of the liquid crystal display devices.

* * * * *

UNITED STATES PATENT AND TRADEMARK OFFICE
CERTIFICATE OF CORRECTION

PATENT NO. : 5,852,479
DATED      : December 22, 1998
INVENTOR(S) : Ueda et al.

It is certified that error appears in the above-identified patent and that said Letters Patent is hereby corrected as shown below:

On the title, item [75]:"Inventors, Kazuhiko Ueda" please change --" Kitakatsutagi-gun" to read -- Kitakatsuragi-gun--.

On the title page, item"[30]: Foreign Application Priority Data" please change "Sep. 7, 1994" to read -- Sept. 7, 1995 --.

Signed and Sealed this

Fifteenth Day of June, 1999

Attest:

Q. TODD DICKINSON

Attesting Officer

Acting Commissioner of Patents and Trademarks